(12) United States Patent
Tucker et al.

(10) Patent No.: US 6,840,088 B2
(45) Date of Patent: Jan. 11, 2005

(54) SUBSEA VEHICLE ASSISTED PUMPING SKID PACKAGES

(75) Inventors: David M. Tucker, Katy, TX (US); Charles R. Yemington, Arlington, TX (US)

(73) Assignee: Valkyrie Commissioning Services, Inc., Houston, TX (US)

( * ) Notice: Subject to any disclaimer, the term of this patent is extended or adjusted under 35 U.S.C. 154(b) by 0 days.

(21) Appl. No.: 10/179,623

(22) Filed: Jun. 25, 2002

(65) Prior Publication Data

US 2003/0010094 A1 Jan. 16, 2003

Related U.S. Application Data

(63) Continuation-in-part of application No. 09/892,314, filed on Jun. 26, 2001, now Pat. No. 6,539,778.
(60) Provisional application No. 60/301,166, filed on Jun. 26, 2001, provisional application No. 60/301,259, filed on Jun. 26, 2001, provisional application No. 60/301,167, filed on Jun. 26, 2001, provisional application No. 60/301,466, filed on Jun. 26, 2001, and provisional application No. 60/301,465, filed on Jun. 26, 2001.

(51) Int. Cl.[7] .............................................. G01M 3/04
(52) U.S. Cl. ........................ 73/49.5; 73/865.9; 73/865.8
(58) Field of Search .............................. 73/49.5, 865.9, 73/865.8; 405/158

(56) References Cited

U.S. PATENT DOCUMENTS

| | | | | |
|---|---|---|---|---|
| 3,640,299 A | * | 2/1972 | Nelson | 137/1 |
| 3,777,499 A | * | 12/1973 | Matthews, Jr. | 405/173 |
| 3,961,493 A | * | 6/1976 | Nolan et al. | 405/158 |
| 5,192,167 A | * | 3/1993 | da Silva et al. | 405/195.1 |
| 5,421,674 A | * | 6/1995 | Maloberti et al. | 405/166 |
| 5,883,303 A | * | 3/1999 | Bliss et al. | 73/49.1 |
| 5,927,901 A | * | 7/1999 | Graves | 405/158 |
| 5,975,803 A | * | 11/1999 | Mackinnon | 405/169 |
| 6,145,223 A | * | 11/2000 | Flesen | 37/317 |
| 6,290,431 B1 | * | 9/2001 | Exley et al. | 405/158 |
| 6,435,279 B1 | * | 8/2002 | Howe et al. | 166/336 |
| 6,503,021 B2 | * | 1/2003 | Corbetta | 405/170 |
| 6,549,857 B2 | * | 4/2003 | Fierro et al. | 702/51 |
| 2003/0145991 A1 | * | 8/2003 | Olsen | 166/265 |

* cited by examiner

*Primary Examiner*—Hezron Williams
*Assistant Examiner*—Rodney Frank
(74) *Attorney, Agent, or Firm*—Kurt S. Myers

(57) ABSTRACT

The present invention is directed to a pumping skid that may comprise a skid structure, a high volume pump, a battery of high-pressure pumps, a chemical water treating tank, a docking plate and a bouyancy compensator. More specifically, the skid is carried by a subsea vechicle (hereinafter "SV") that provides the power to the pumps located on the skid to inject water/chemical, pressurize the water, dewater, and dry, the pipeline. The present invention may be part of the commissioning of a new or old pipeline or a new portion of a pipeline in which a purging of the line with a compressed gas and drying of the line is required. After commissioning, product flows through the pipeline.

8 Claims, 20 Drawing Sheets

SUBSEA VEHICLE ASSISTED PUMPING SKID PACKAGES

RELATED APPLICATION

This application is a continuation-in-part application of U.S. patent application Ser. No. 09/892,314, filed Jun. 26, 2001, now U.S. Pat. No. 6,539,778 entitled "Subsea to Subsea Remotely Operated Vehicle Assisted Pipeline Commissioning Method", and is based on provisional application No. 60/301,166, filed Jun. 26, 2001, entitled "Subsea to Subsea Remotely Operated Vehicle Assisted Pipeline Commissioning Method—fill and test method"; provisional application No. 60/301,259, filed Jun. 26, 2001, entitled "Subsea to Subsea Remotely Operated Vehicle Assisted Pipeline Commissioning Method—filters and chemical treatment"; provisional application No. 60/301,167, filed Jun. 26, 2001, entitled "Subsea to Subsea Remotely Operated Vehicle Assisted Pipeline Commissioning Method—compressed gas packs"; provisional application No. 60/301,466, filed Jun. 26, 2001, entitled "Subsea to Subsea Remotely Operated Vehicle Assisted Pipeline Commissioning Method—drying"; and provisional application No. 60/301,465, filed Jun. 26, 2001, entitled "Subsea to Subsea Remotely Operated Vehicle Assisted Pipeline Commissioning Method—panels".

FIELD OF THE INVENTION

The present invention is directed to the skids used in the subsea to subsea, remotely operated vehicle assisted, commissioning methods for subsea pipelines. More specifically, the present invention is directed to skids moved by and powered by a subsea vehicle (hereinafter "SV") used for filling, pigging, testing and/or drying in a commissioning method wherein the operation is carried out seabed and the SV powers the pumps rather than using equipment at the surface.

BACKGROUND OF THE INVENTION

U.S. Pat. No. 5,883,303 discloses and describes an apparatus and method for pigging, flooding and pressure testing pipelines utilizing a sliding sleeve valve connected at the end of a pig receiver which automatically opens upon fluid pressure in the pipeline reaching a predetermined limit allowing fluid trapped in the pipeline to escape, and is then automatically closed when the pig enters the pig receiver to allow pressure testing of the pipeline.

U.S. Pat. No. 5,927,901 discloses and describes an underwater pipeline apparatus for delivering a pig unit through an initially air or gas-containing seabed pipeline from an entry point toward an exit point. The apparatus includes an inlet conduit for coupling to a pipeline inlet port at a location behind the pig unit in its intended direction of travel, from the entry point to the exit point, having an opening to the sea to admit pressurized water into the pipeline under the head of water above the pipeline and means to regulate flow of water through the inlet conduit into a pipeline to regulate the speed of delivery of the pig unit along the pipeline.

U.S. Pat. No. 6,109,829 discloses and describes a system for transporting a pig along the interior of a pipeline, particularly for the purpose of installing a liner in the pipeline by towing the liner behind the pig, in which a hydrostatic head is applied on either side of the pig and the head on the downstream side of the pig is reduced such that the pig is transported along the interior of the pipeline by the resultant pressure differential.

The skids of the present invention are moved by and powered by an SV that works at or near the seabead floor. The SV powers the pumps on the skids and eliminates any additional long lengths of power line or cable normally used in prior art methods and apparatus. Also eliminated are the long lengths of coiled tubing, hose, pipe or conduit, and substantial surface support vessel/vessels, all required by the prior art methods. In the dewatering commissioning method, the present invention reduces significantly the volume and required pressure of compressed gas and/or fluids and the size of the pumps, compressors and/or compressor boosters necessary to handle these fluids.

SUMMARY OF THE INVENTION

The present invention is directed to a method and apparatus for completing the filling, pigging, testing and/or dewatering commissioning of a subsea pipeline. More specifically, the present invention is directed to the skids used with a subsea vechicle or SV. The SV moves skids, which have pumps mounted on the skids and may place the skid on or near the subsea floor or move the skid from one end of the pipeline being commissioned to the other end. "Pipeline" as used herein has a broad meaning that includes all flowlines, new pipelines, portions of pipelines new or old, extensions and the necessary equipment or apparatus that ties lines together such as subsea manifolds. The SV powers the pumps located on the pump skids Upon commissioning, product flows through the pipeline.

BRIEF DESCRIPTION OF THE PREFERRED EMBODIMENTS OF THE PRESENT INVENTION

Offshore drilling for oil/gas is continuing to expand at further distances from shore and at greater depths. Subsea pipelines are utilized to transport the discovered product to a variety of disposition points. These points include existing or new offshore christmas trees, manifolds, pipelines, platforms, or onshore facilities. As new wells are completed subsea pipelines flowing the product are tied through manifolds to existing pipelines that are already in place to bring the product to shore. As dictated by law, the new sections of pipeline require hydrotesting to make certain that the line has no leaks. In addition to hydrotesting, other steps in the commissioning of the pipeline may be required, including pigging, cleaning, dewatering, drying, and installing chemicals. The present invention relates to any or all the steps as related to the commissioning of these subsea pipelines carried out on the pipelines on the seabed rather than at the surface.

Once a well is completed, a pipeline is connected to the well for transporting the product to shore. The pipeline is often not extended all the way to shore but is tied through a manifold or connection to offshore facilities. Manifolds as used herein may have a variety of specific structures; however, the common function for the purpose herein is that sections of pipelines are connected to other facilities, including other pipelines via various connection assemblies referred to herein as manifolds. Also common to a manifold as used herein is that there is structure to provide internal access to the pipeline. The subsea performance or operation of the commissioning methods of the present invention, will be described as commissioning a pipeline between two manifolds. However, it is understood that the present invention is not limited to a total commissioning of a pipeline between two manifolds as will be described but includes any subsea pipeline or pipeline segment that has both ends at the seafloor at the time of filling, cleaning, pigging, testing and/or dewatering.

The present invention is directed to a commissioning method wherein the operation is carried out on or near the seabed rather than at the surface. It is illustrated by using a subsea vehicle and pumping skid to assist in the operation and assumes that valves require to be mechanically operated from the subsea vehicle. This is only one embodiment of the invention since the degree of assistance necessary by the subsea vehicle may be materially reduced with the use of automated valves not requiring mechanical operation. The subsea vehicle may carry the pumping skid or simply transport the skid near or on the subsea floor as shown in the embodiments illustrated by the drawings.

Figure 1:
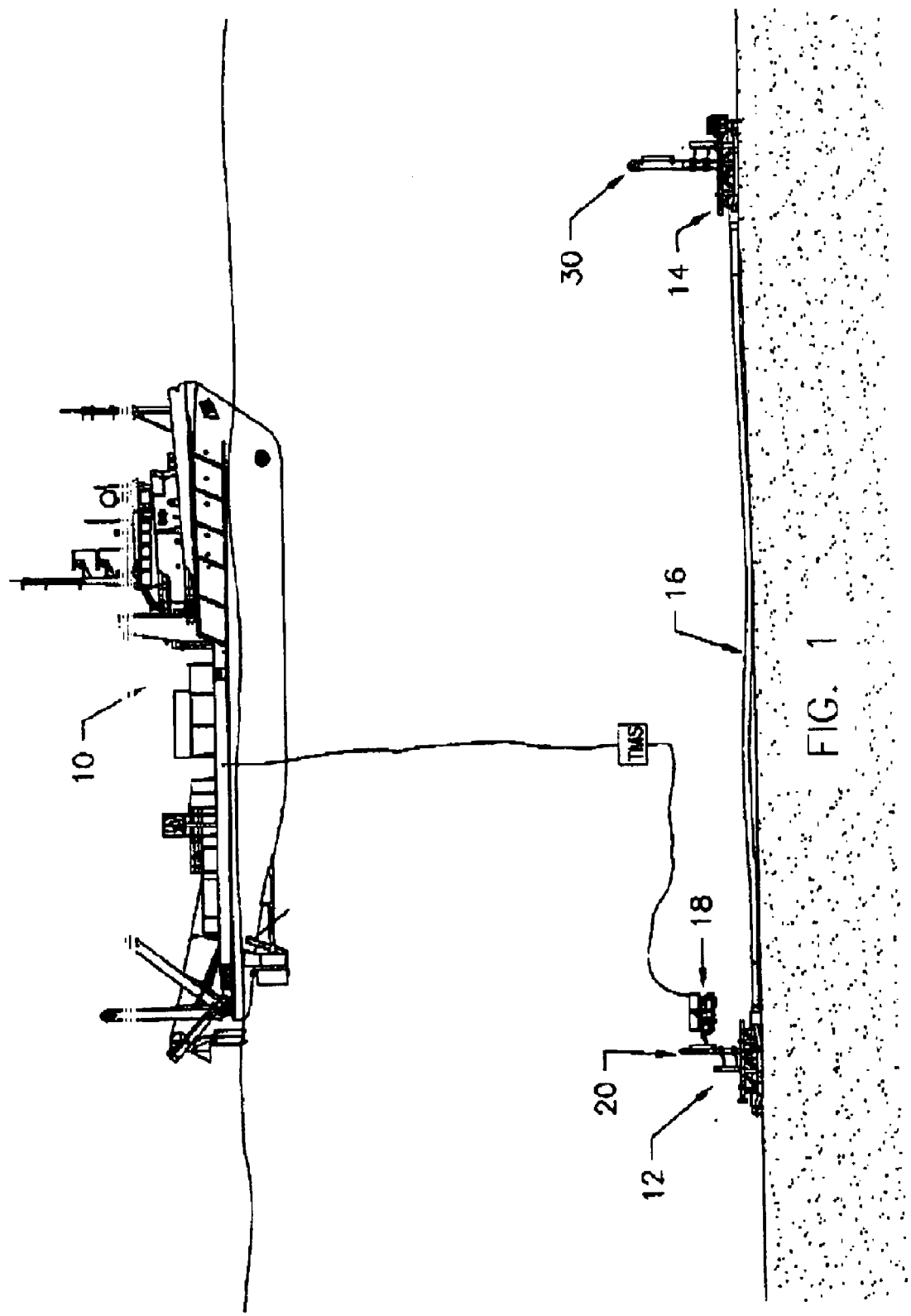
FIG. 1 is a schematic view of a surface support vessel positioned to serve a subsea pig launcher on a manifold on the seabed and a subsea pig receiver on a second manifold connected by a subsea pipeline.

Referring to FIG. 1, a surface support vessel (or multiple vessels if required) 10 is positioned at the surface above a subsea pipeline 16 that has connected to one end a manifold 12 and at the other end a manifold 14. The vessel 10 supports the commissioning (the internal cleaning of the pipeline, the hydrostatic testing for leaks and the removal of water and the partial product fill) of pipeline 16 before product is allowed to be transported by pipeline 16 for passage to shore. The commissioning process is assisted by a subsea vehicle (SV) 18. The SV may be a remotely operated vehicle (ROV) or autonomous underwater vehicle (AUV) as these vehicles are known in the prior art, or they may be modified for the purposes of the present invention, or may include any manned or unmanned vehicle that has a system that can manipulate the hoses, pumps and other equipment used in the commissioning method. The SV 18 may be tethered to the support vessel 10 and may have a tether management system (TMS) assuring that the tether is not in the way of any operation. The SV 18 provides the electrical system for its operation and other equipment, as will be described hereinafter. Alternatively, an electrical umbilical cord may be part of the tether and tether system.

The SV 18 may install, by use of it's robotic arm 19, a subsea pig launcher 20 on manifold 12 and a subsea pig receiver 30 may be placed on manifold 14. In an equally desirable operation, the pig launcher 20 may be installed on one pipe end and the pig receiver 30 at the other pipe end and laid with the pipe at the time the pipeline is laid. A pig 22, which is a known structure used in cleaning or maintaining fluids separate in a pipeline, is in or placed into the launcher (see FIG. 2). The use of more then one pig 22 is common, one to push debris out of the pipeline and one to scrape the inside wall of the pipeline.

If a single SV 18 is employed, the SV may move equipment such as the pig launcher 20 and the pig receiver 30 for installation and then return to the surface support vessel 10 to acquire a pumping skid 40 which may include pump(s) and lines that are connected through either panel 24 or 34, associated with manifolds 12 or 14 respectively, as will be described in more detail hereinafter.

A single skid or package 40 may be moved and powered by the SV 18 during the remainder of the commissioning process; however, a specially equipped skid or package 40 designed for the specific operation may be attached to the SV or placed on or near the sea floor for connection to the pig launcher 20 is also an alternative. Specially equipped skids 40 will be described herein below, such as a skid designed to fill the pipeline 16 and move at least one pig from manifold 12 to manifold 14.

Figure 2:
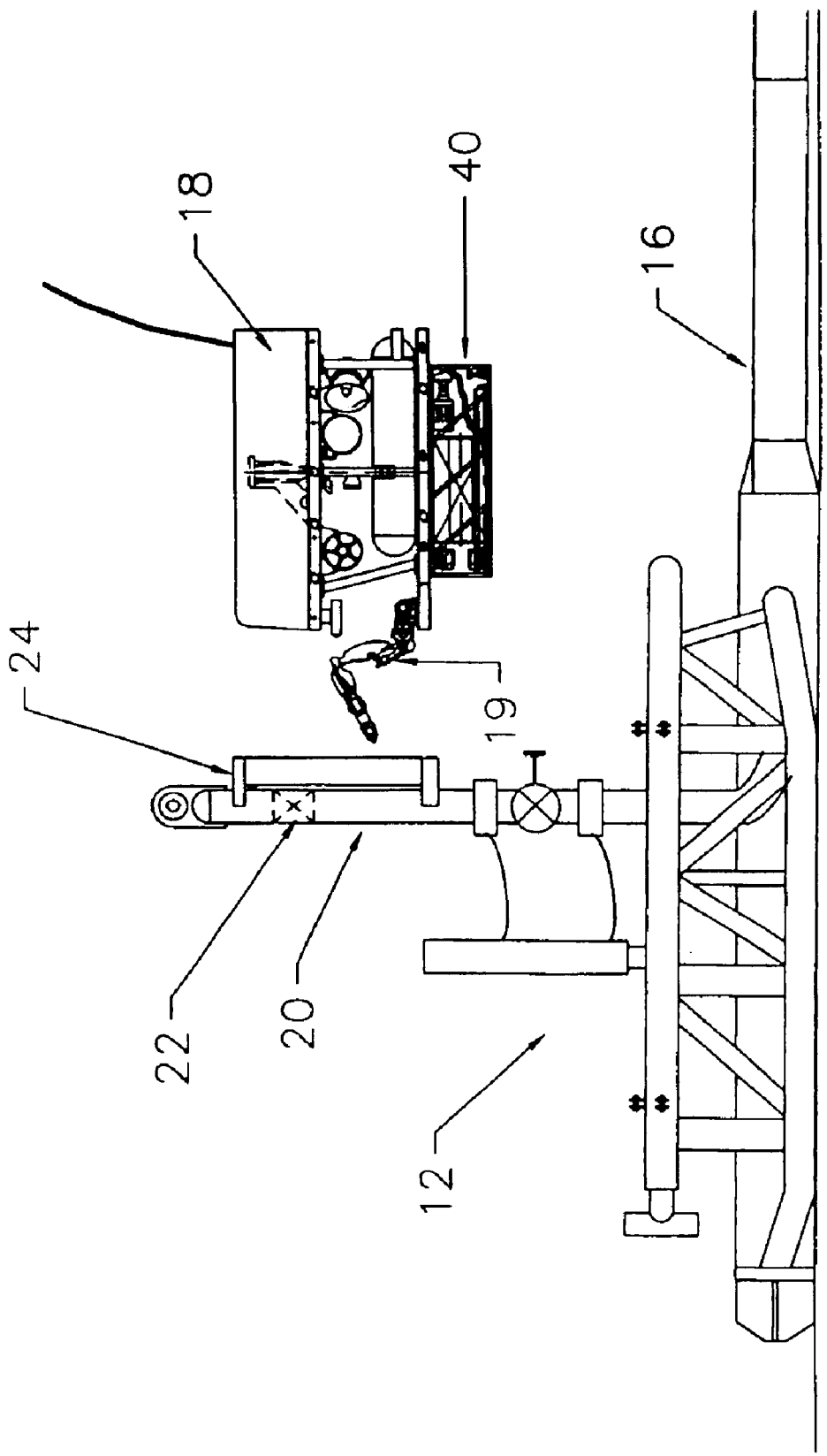
FIG. 2 is a schematic view of a subsea pig launcher stabbed into a manifold on the seabed and a SV carrying a fill and test package of equipment to carry out a commissioning method.
Figure 3:
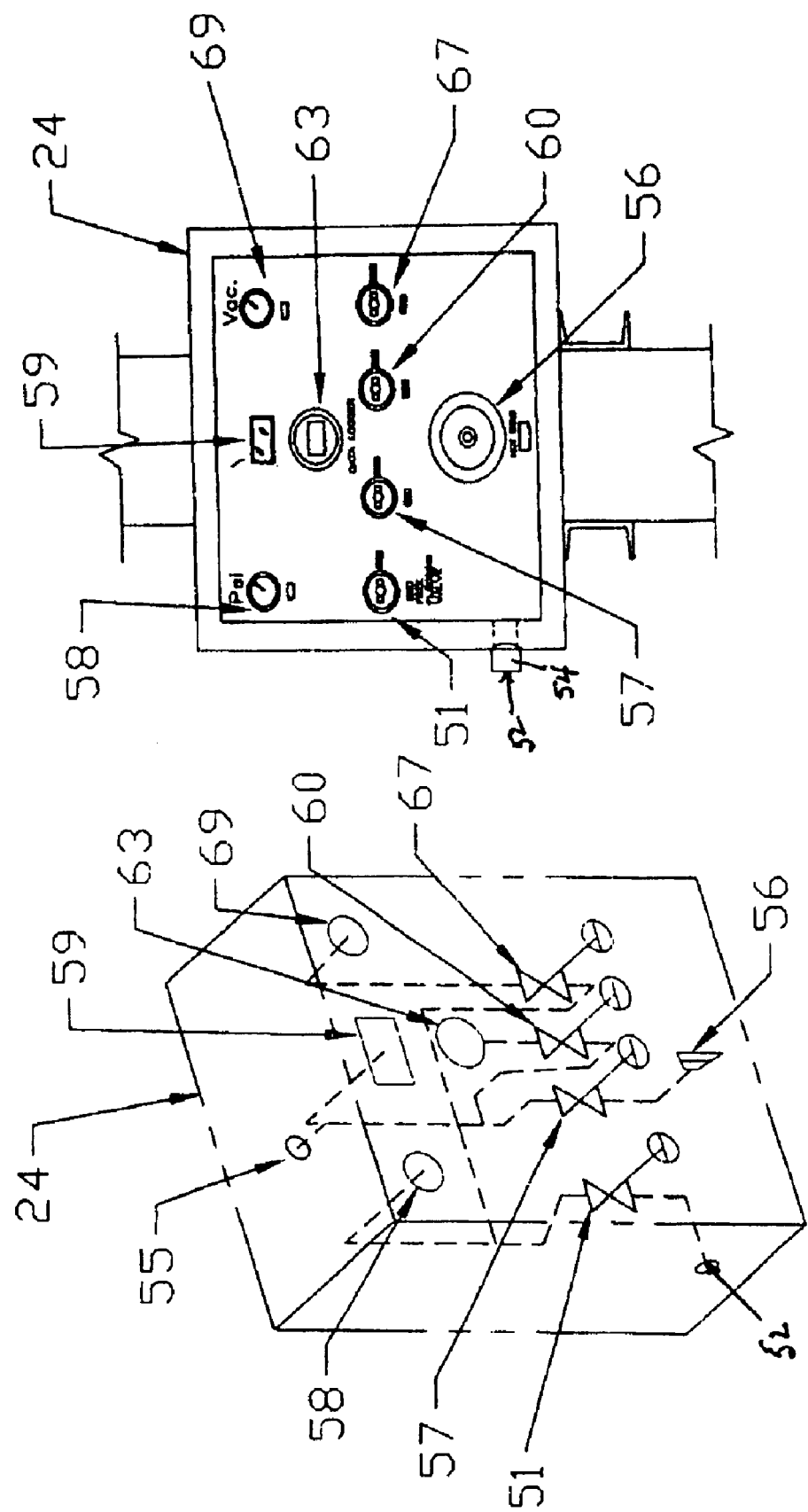
FIG. 3 is a view of one possible panel face connected to the subsea pig launcher and a representative schematic of the valves included in the panel for carrying out a filling and testing method.

Referring now to FIG. 2, manifold 12 is at one end of pipeline 16 and may have one or more other pipelines connected at manifold 12. The subsea pig launcher 20 is connected to the manifold in any orientation that allows access to pipeline 16. At least one pig 22 is in the pig launcher 20. A panel 24 (see FIG. 3) is associated with manifold 12 and may be mounted on pig launcher 20; however, the panel may be mounted on the skid 40 or the SV 18. The panel 24 contains passageways, valves and gauges to control the flow of fluids and gasses that enter pipeline 16.

The robotic arm 19 on the SV 18 connects the pump(s) on the skid 40 with the panel 24, which is connected behind the pig launcher 20 to move pig(s) 22 through the pipeline 16. In one embodiment, the flow of water behind pig 22 is begun by opening free flooding valve 51 to force the pig 22 through pipeline 16 to clean any solid debris that remains in the pipeline after being laid in place. Upon opening valve 51 in panel 24, seawater enters through opening 52 of a filter 54, where the seawater is filtered and chemical may be injected, and passes through panel 24 and out opening 55 connected to pipeline 16 before pushing pig 22 through pipeline 16 until the pressure on either side of the pig equalizes. A check valve (not shown) on the pig receiver 30 allows the air and/or liquid in front of the pig to exit the receiver side of the pipeline 16. The SV 18 then moves to the pig receiver 30.

Figure 4:
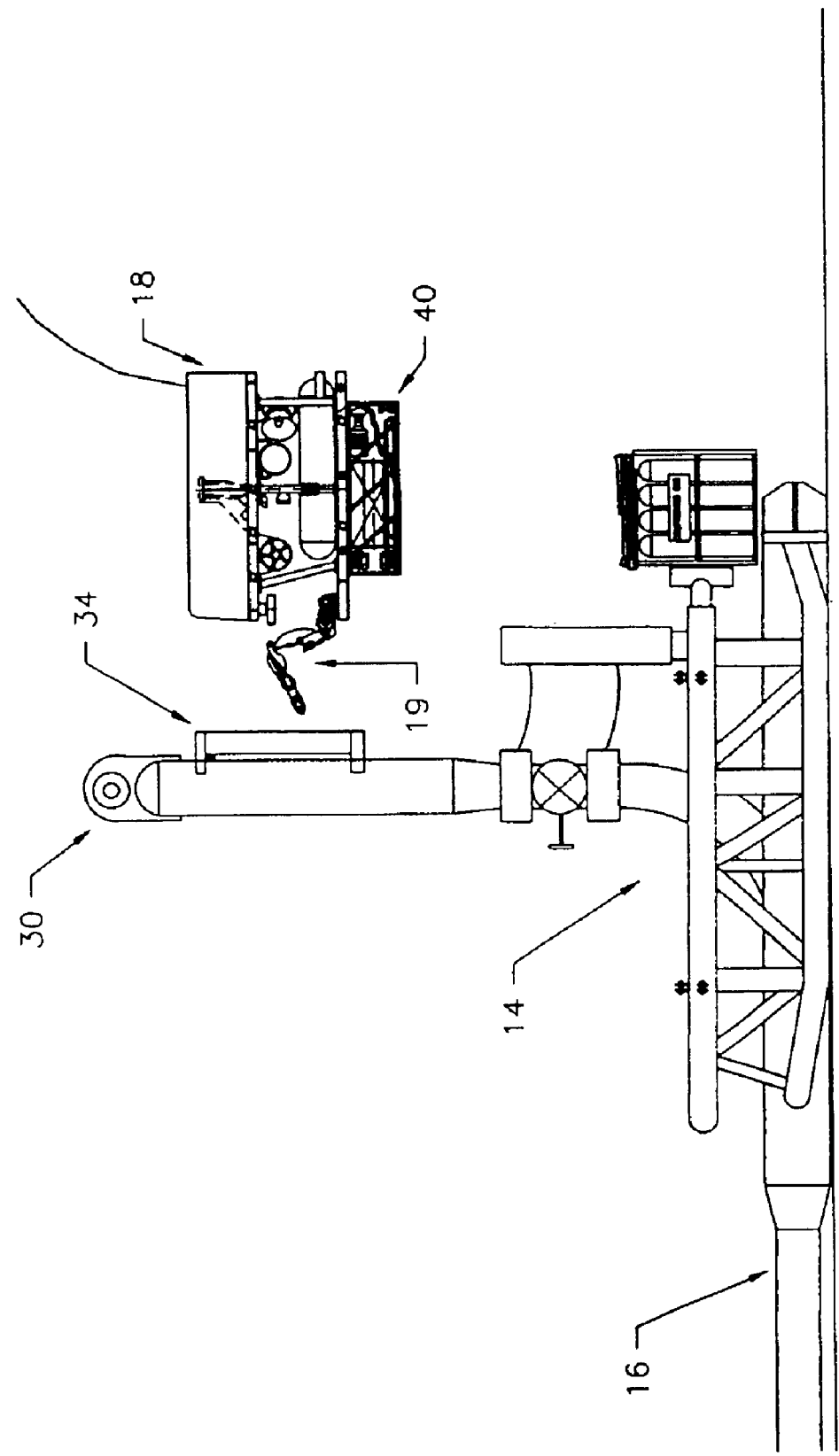
FIG. 4 is a schematic view of a subsea pig receiver connected to a manifold on the seabed and assisted by a SV.
Figure 5:
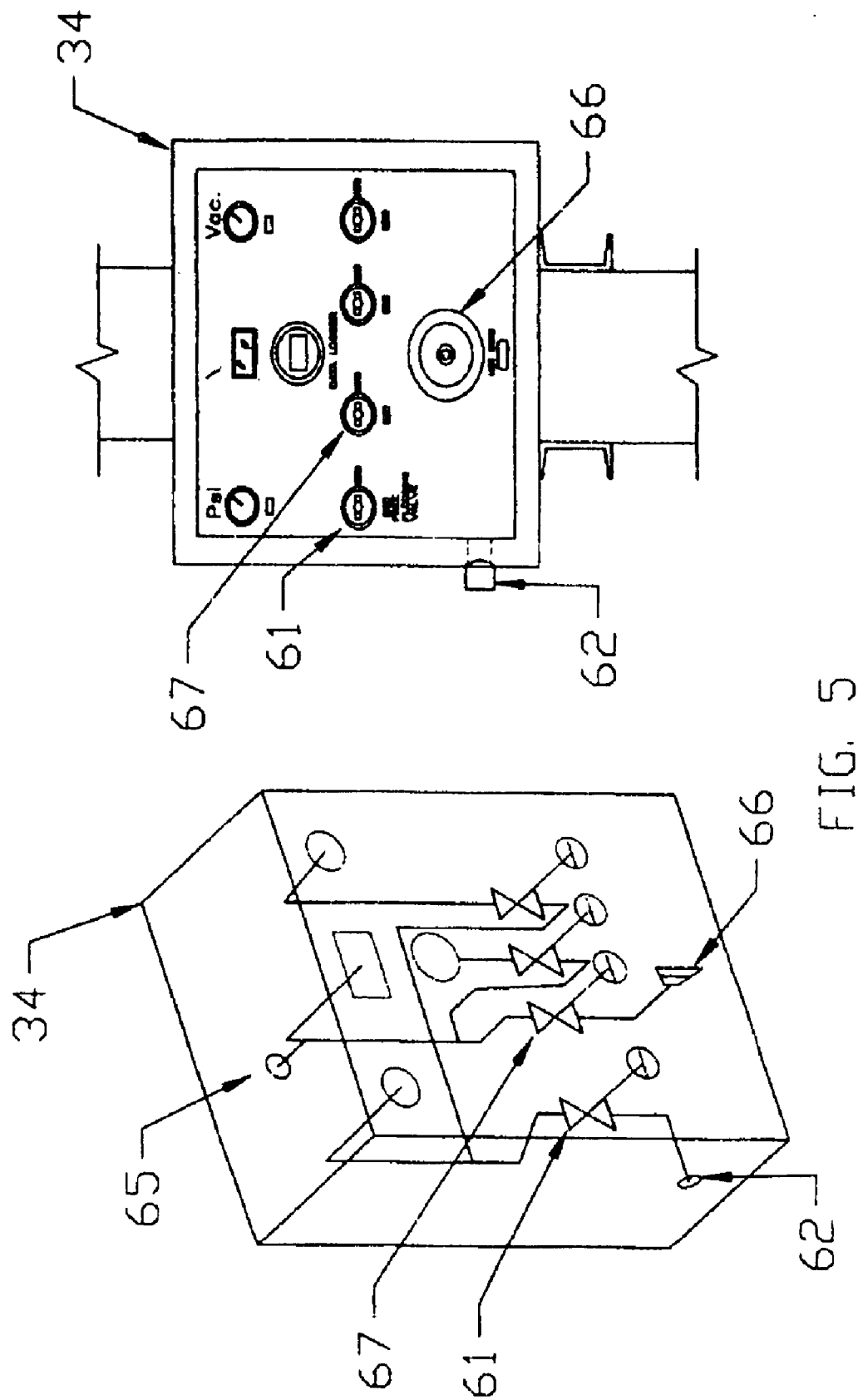
FIG. 5 is a view of one possible panel face connected to the subsea pig receiver and a representative schematic of the valves included in the panel for carrying out a commissioning method.

Referring now to FIG. 4, manifold 14 may have a vertical section to which the subsea pig receiver 30 is connected so as to have access to pipeline 16. A panel 34 (see FIG. 5) is associated with manifold 14 and may be mounted on pig receiver 30; however, the panel 34 may be mounted on the skid 40 or the SV 18. The panel 34 contains passageways, valves and gauges to control the flow of fluids through pipeline 16. The SV 18 opens the discharge valve 61 of panel 34. It is recognized that the method described assumes that each panel 24 and 34 requires the assistance of the SV 18 to open and close the valves; however, if the valves on either panel are automated and are operated from the surface or the SV 18, then the SV need not make this trip from the pig launcher 20 to the pig receiver 30 as described. When the valves are not automated and the SV 18 is required to open the valves, the SV then returns to the pig launcher 20. It is recognized that the specific sequence of events will depend upon the requirements of specific applications, and that the sequence stated here is representative but is not the only method in which the described system may be operated.

Figure 6:
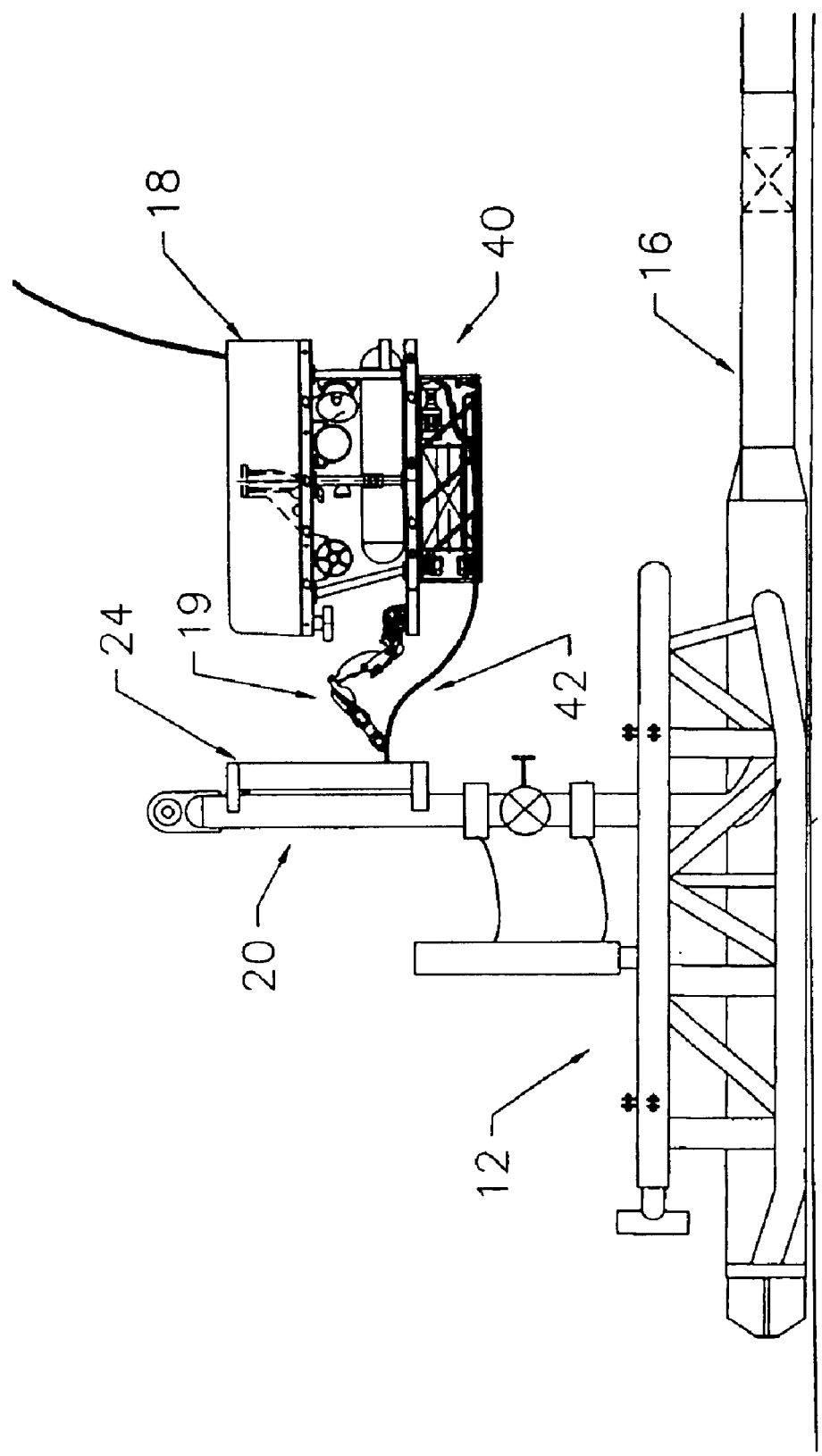
FIG. 6 is a representative schematic view of the pump of the fill and test package of equipment connected at one subsea pig launcher pushing the pig through the pipeline to the subsea pig receiver at the other end of the pipeline.

Referring to FIG. 6, the SV 18 then closes free flowing valve 51 on the panel 24. A line 42 from the skid 40, specifically from a high volume pump, is connected to port 56 on the panel 24 and valve 57 is opened. Seawater is pumped through line 42 and the panel 24 and out opening 55 connected to pipeline 16 to force pig 22 to the pig receiver 30.

Figure 7:
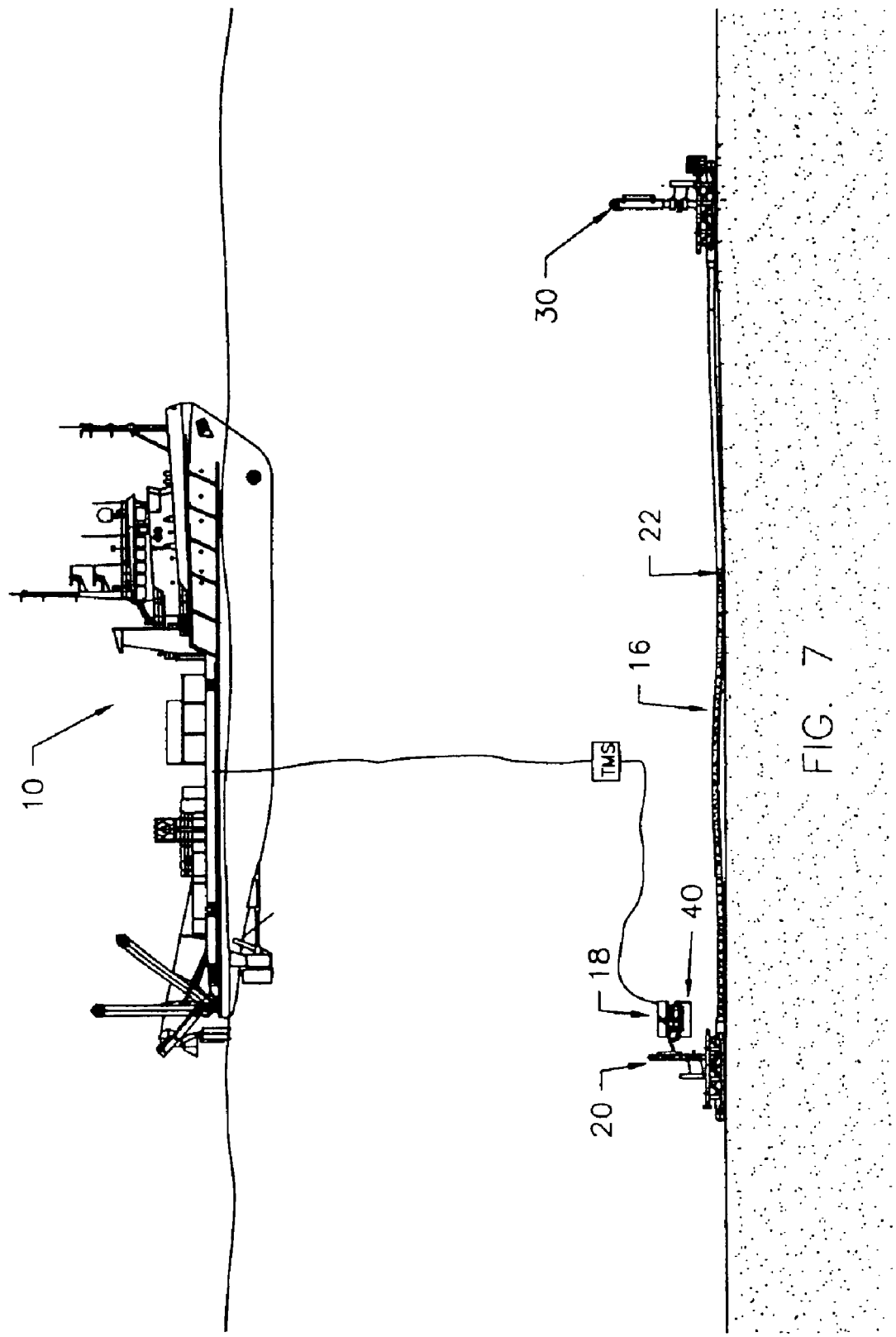
FIG. 7 is a schematic of the SV tethered from the support vessel connected to the subsea pig launcher and powering the pump to push the pig through the subsea pipeline to a subsea pig receiver.

The operation of filling the pipeline 16 with seawater pumped from pig launcher 20 to pig receiver 30 is illustrated in FIG. 7. An aspect of the present invention is that the pumping is carried out with pump(s) on and powered by the skid package 40 moved by SV 18, or placed on the seabed, rather than pumps on board the surface support vessel 10. Thus, the entire operation is done subsea rather than using the long lines and large equipment that is necessary if done on the surface. The umbilical for the SV 18 may be thousands of feet long and the subsea operation of the present invention eliminates those number of feet of coiled tubing or other conduit usually used in this operation. Pumping is continued until the pig(s) 22 arrives in the pig receiver 30. Arrival of the pig(s) at the receiver is detected by any of a variety of pig detectors commonly known in the industry. The SV 18 then moves to the pig receiver 30 if the SV 18 is necessary to activate the valves.

Figure 8:
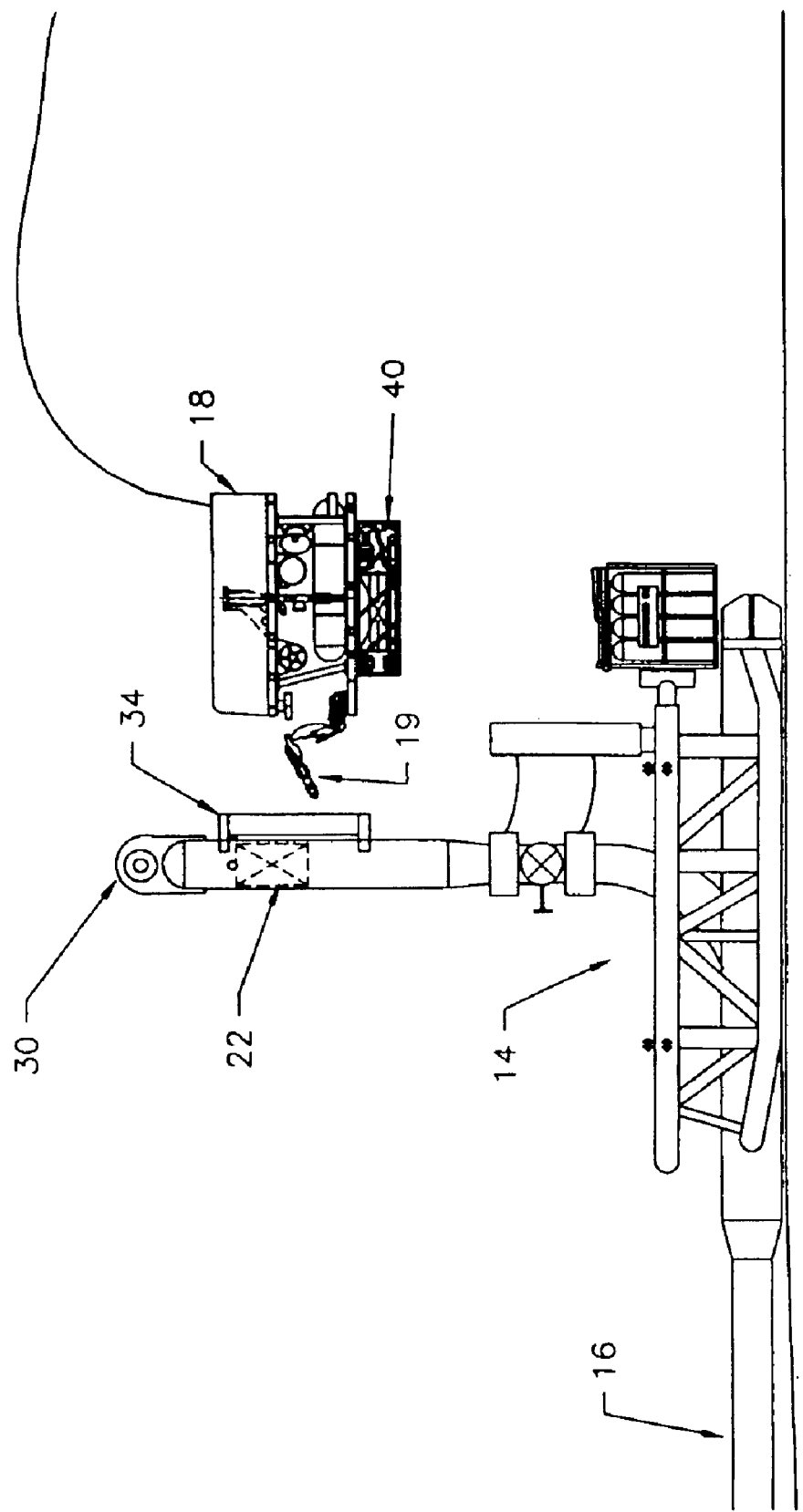
FIG. 8 is a representative schematic of the subsea pig receiver where a pig has arrived in the receiver.

Referring now to FIG. 8, the SV 18 positioned at the pig receiver 30 closes valve 61 on panel 34 and closes exit opening 62 in preparation for the hydrostatic testing of pipeline 16. The SV 18 then moves to the pig launcher/receiver 20.

Figure 9:
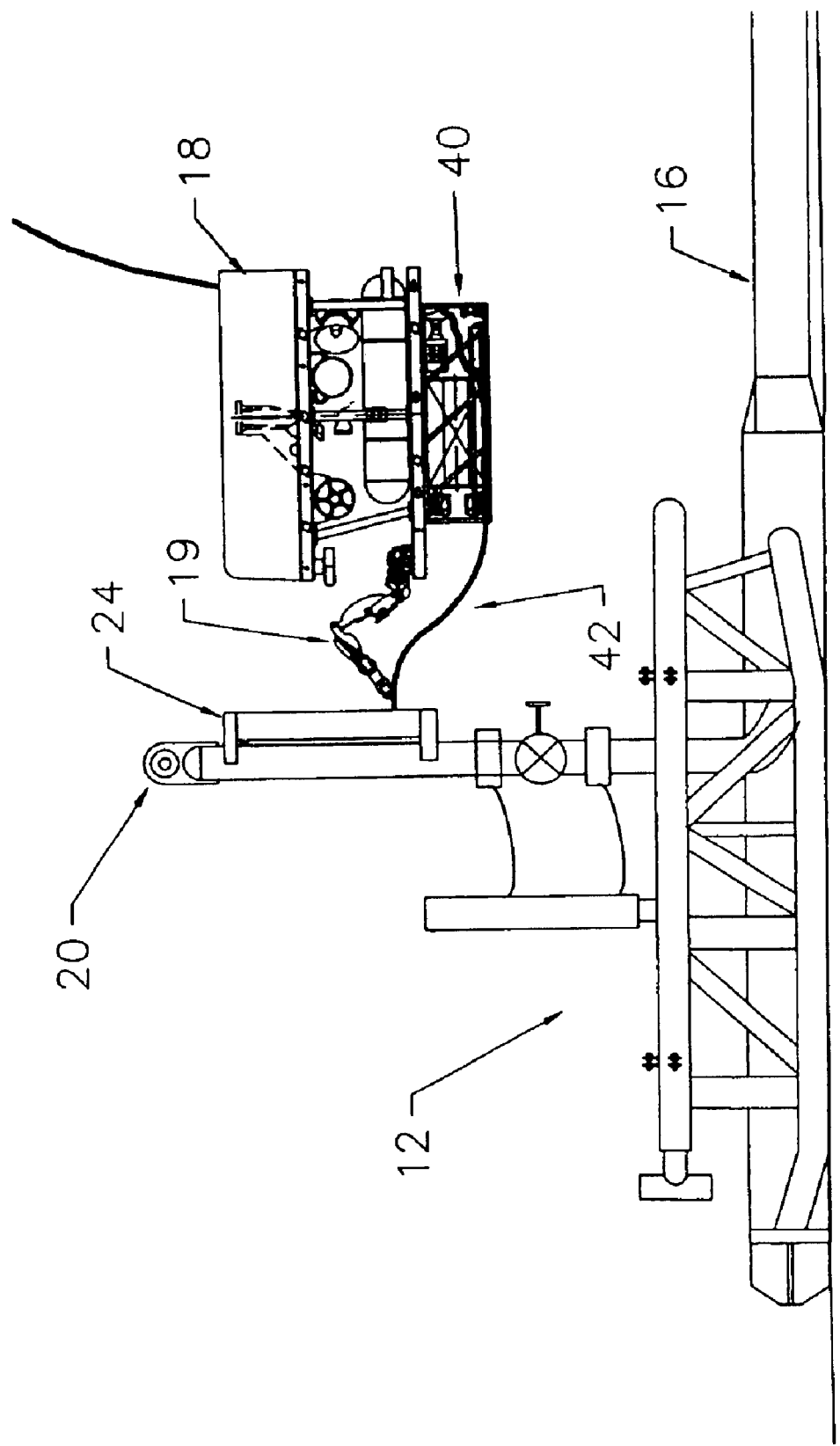
FIG. 9 is a representative schematic of the SV attaching a high-pressure pump to the pipeline to perform a high-pressure hydrostatic test on the pipeline.

Referring now to FIG. 9, SV 18 uses robotic arm 19 to connect line 42 from the skid package 40, specifically from a high pressure pump, into the hot stab 56 on the panel 24 and valves 57 and 60 are opened. It is recognized that, depending on the specific application, it may be preferred to perform these steps in a different sequence, and it may be preferred to connect the pump to either the launcher or receiver end of the pipeline for hydrostatic testing. Seawater is pumped through line 42, through panel 24, and opening 55 to increase the pressure in the pipeline 16 to testing level. The pressure is monitored by pressure gauge 58 and data recorder 63. Opening valve 67 gives access to a gauge 69 that may be used for measuring temperature or other desired characteristic of the water, all of which may be recorded in the data recorder 63. The test pressure is maintained for a length of time to make certain that there are no leaks in the pipeline 16. Any drop in pressure indicates a potential problem and the first corrective measure may be to repressure to test pressure and wait another length of time to make certain the pipeline 16 will maintain pressure.

Figure 10:
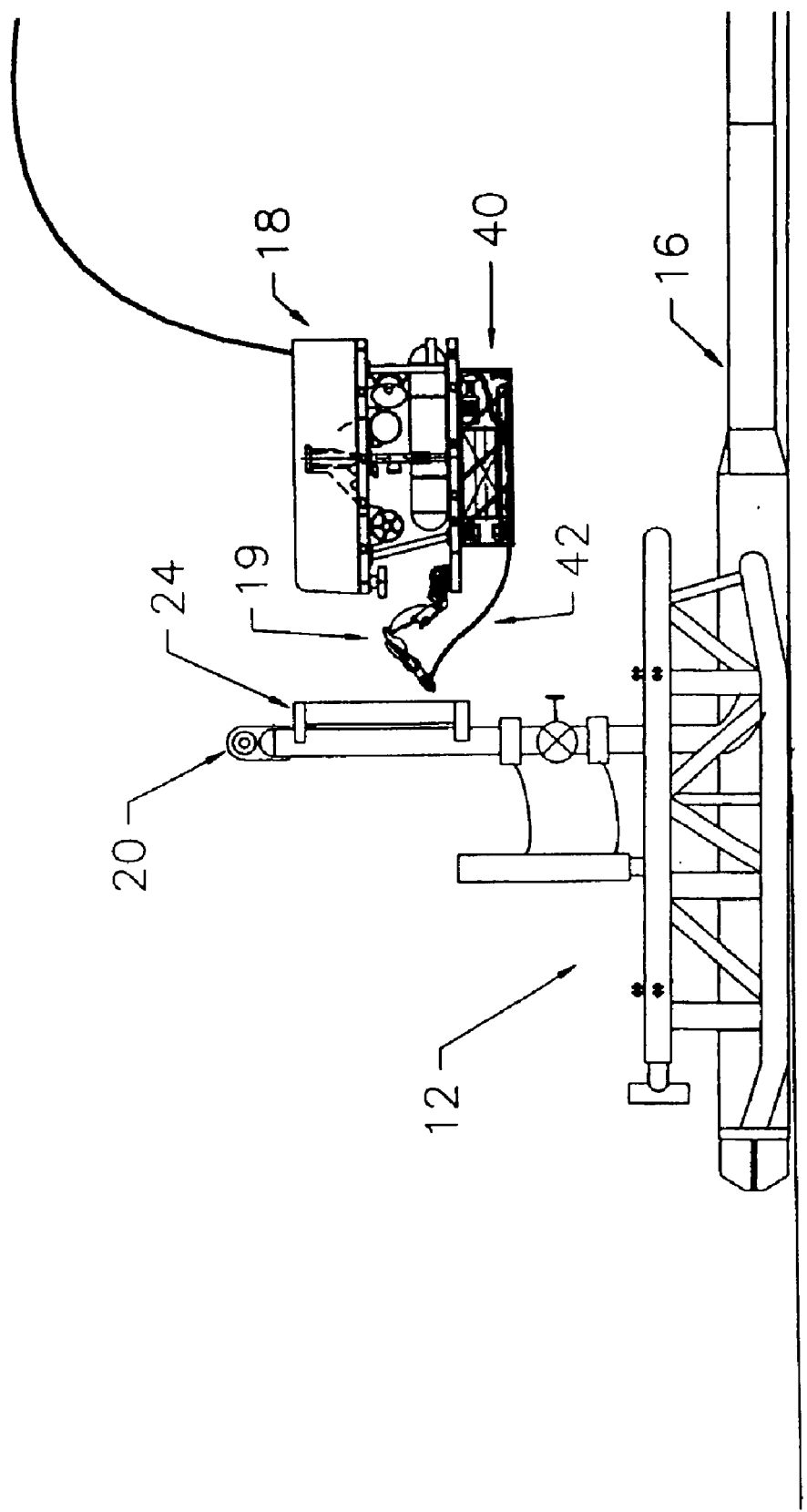
FIG. 10 is a schematic of the SV disconnecting the high-pressure pump(s) after completeing the high-pressure hydrostatic commissioning test and opening a valve to release the testing pressure from the pipeline.

Upon successful completion of the hydrostatic testing of the pipeline 16, the SV 18 disconnects line 42, referring now to FIG. 10, and closes valve 57 and 60 and vents the pipeline through a flow restrictor and/or free flooding valve 51 on the panel to depressure the pipeline 16. The flow of the water in the pipeline 16 will exit through valve 51; however, the flow is controlled and measured by flow meter 59 so that the depressurization is slow and even and does not cause any vibrations or other disturbances to the pipeline 16. Monitoring of the pressure gauge 58 and flow meter 59 as the flow of water passes through opening 55 and valve 51 is maintained until the internal pressure reaches ambient pressure, meaning that the pressure inside and outside the pipeline 16 are the same. This completes the hydrostatic hyrostatic) testing operation. The SV 18 then moves to the pig receiver 30.

When commissioning a subsea pipeline, or adding a new segment to an existing offshore pipeline, it is often desired to follow the hydrostatic pressure testing with an inert gas or specified medium to purge/dewater the subsea pipeline, and/or inject specified chemicals, to dry the inside of the line before flow of the oil/gas in the pipeline.

Figure 11:
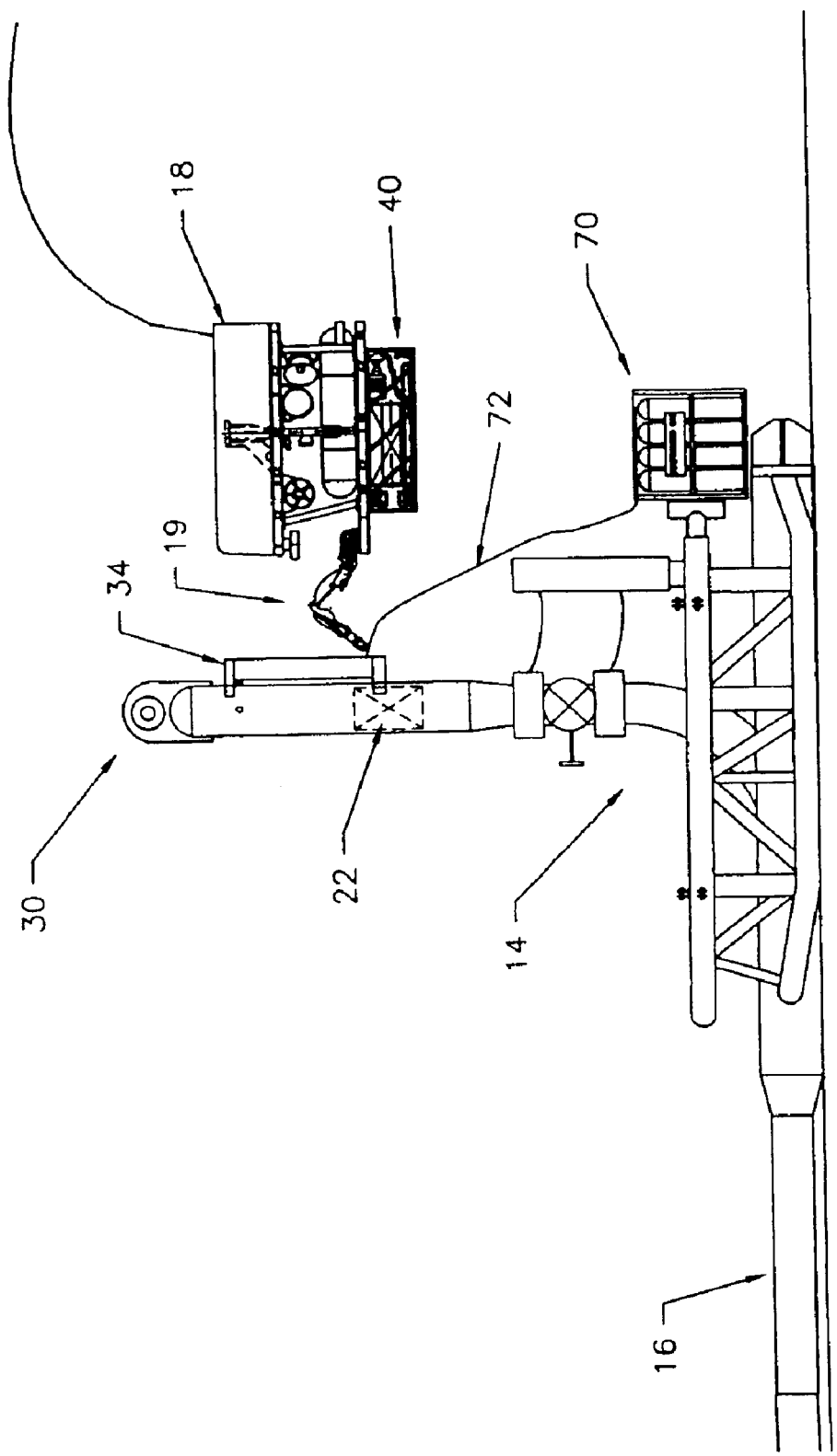
FIG. 11 is a representative schematic of the SV attaching a compressed gas source to the pipeline to force a pig through the pipeline from the launcher to the subsea pig receiver.

Referring now to FIG. 11, a dewatering operation using compressed gas is illustrated. A compressed gas pack (gas source that may be nitrogen or air) 70, is shown connected to the pig receiver 30. The gas pack 70 may be mounted to manifold 14 or laid on the subsea floor, or connected by a conduit from a remote site. The connection of the gas pack 70 to the panel 34 may be made by any suitable method, including using the robotic arm 19 of the SV 18 to connect a line 72 from the pack 70 into a hot stab 66 in panel 34. The valve 57 is opened and the compressed gas is introduced behind the pig 22 to push all water in the pipeline 16 to the pig launcher 20 end of the pipeline. The SV 18 then moves to the pig launcher 20 to assist in moving the pig 22 to the subsea pig launcher 20.

Figure 12:
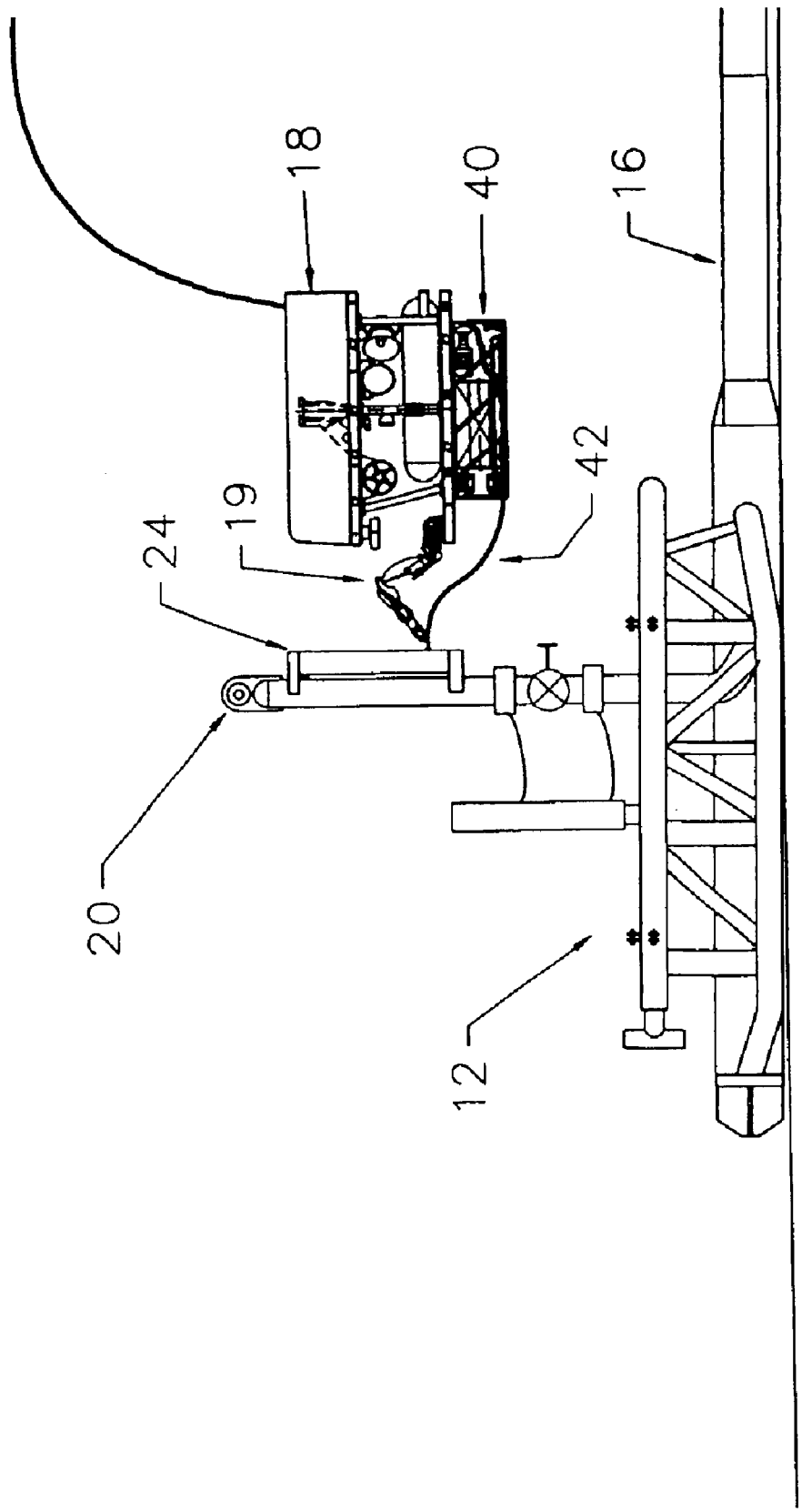
FIG. 12 is a schematic of the SV connecting the dewatering pump to remove the water from the pipeline and to move a pig through the pipeline.

Referring now to FIG. 12, SV 18 uses robotic arm 19 or other suitable method to connect line 42 from the skid 40, specifically from a dewatering or vacuum pump, into port 56 of the panel 24. The valve 57 is opened and the pipeline 16 is dewatered. Seawater is pumped through opening 55, valve 57 and line 42, reducing the pipeline internal pressure at the launcher end so that a modest volume of compressed gas can push pig 22 by differential pressure toward the pig launcher 20.

Figure 13:
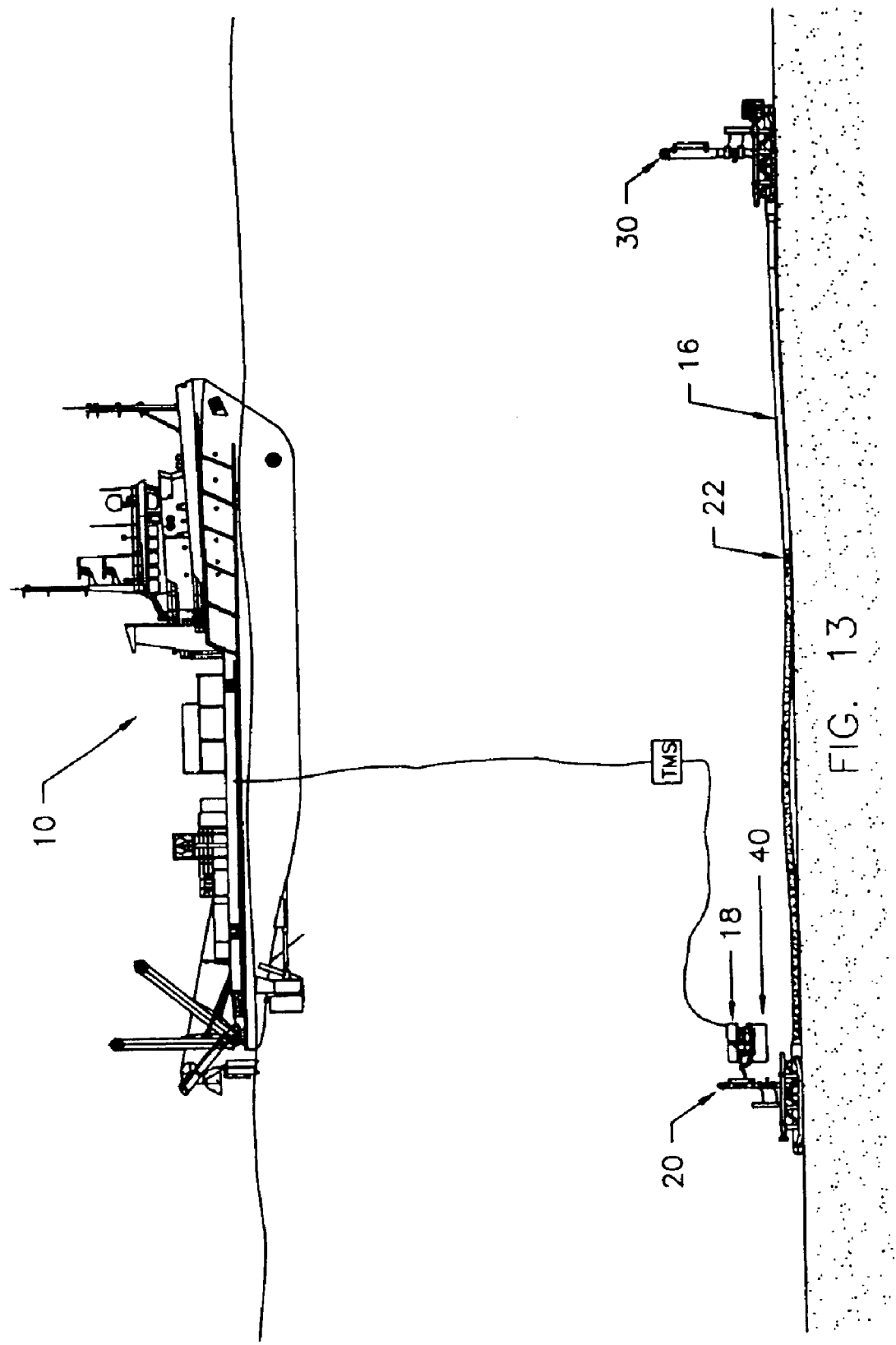
FIG. 13 is a schematic of the SV tethered from the support vessel and powering a pump to remove the water from the pipeline that enables the compressed gas to push the pig toward the receiver.

The operation of dewatering and pigging the pipeline 16 by pumping water through the pig launcher 20 from pipeline 16 is illustrated in FIG. 13. An aspect of the present invention is that the pumping is done from the skid 40 powered by SV 18 rather than pumps mounted on the support vessel 10. The operation being done subsea eliminates the long lengths of coiled tubing, hoses, or piping, and the large pumps that are necessary when the operation is done at the surface. The volume and pressure of compressed gas is significantly reduced. Since the gas in the pipeline is at a relatively low pressure, significantly smaller quantity of compressed gas is required as compared to prior art methods. An additional advantage is that a smaller support vessel may be utilized. The operation of dewatering and pigging, meaning that the water is forced out of pipeline 16 by the pig 22 being pushed by compressed gas, is complete. The SV 18 then shuts off the dewatering pump and closes valve 47 on the panel 24. The pipeline 16 is now fully commissioned and ready for product to be passed through the pipeline 16. The SV 18 disengages line 42 and makes any necessary securing of manifold 12 as is deemed necessary or desirable. The SV 18 then moves to the pig receiver 30.

Figure 14:
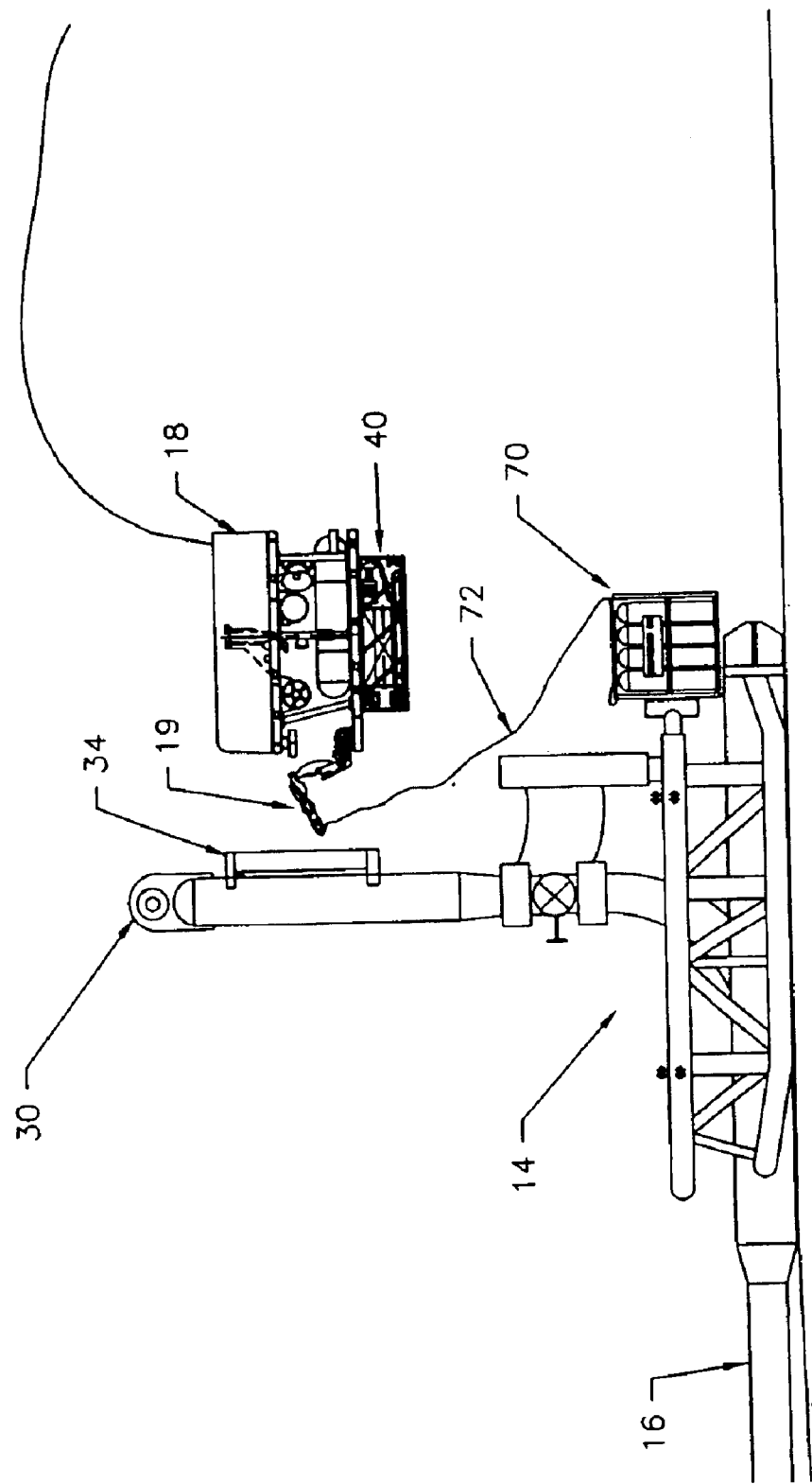
FIG. 14 is a schematic of the SV disconnecting the compressed gas source after filling the pipeline with gas.

Referring now to FIG. 14, the SV 18 closes valve 57 and disengages compressed gas line 72 from panel 34. The compressed gas pack 70 is made secure or connected to the SV 18 to be returned to surface. The SV 18 makes any necessary securing of manifold 14 as is deemed necessary or desirable. The commissioning operation that includes cleaning, hydrostatic testing, dewatering, and partial product fill is complete. It is understood that all steps are not necessary if the operation includes less than the commissioning operation as set forth. Additionally, an additional step may be included whereby the product is introduced into the pipeline.

Figure 15:
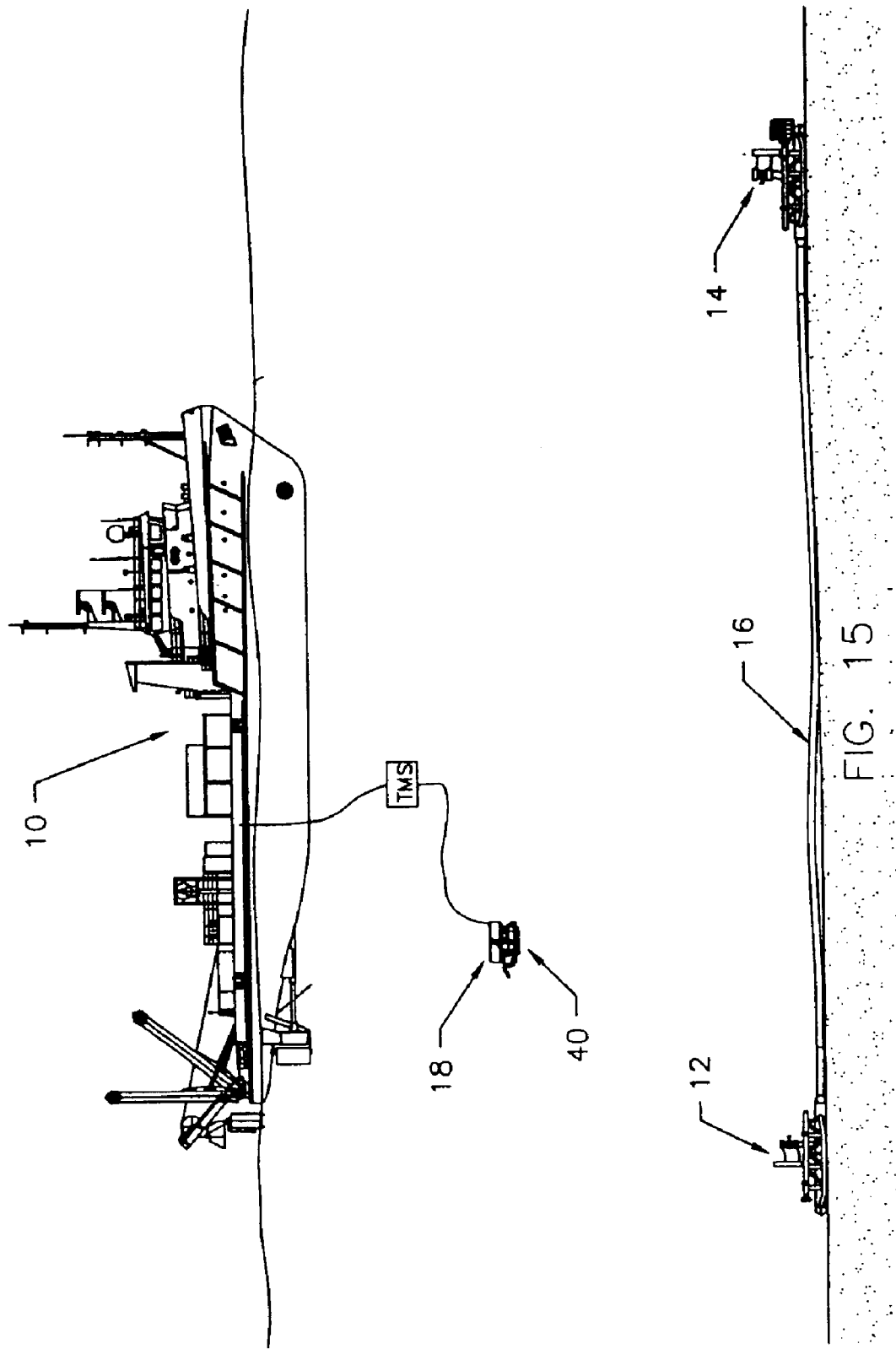
FIG. 15 is a schematic of the completed dewatered pipeline and the recovery of the SV and other equipment as required, to the support vessel.

Referring now to FIG. 15, the SV 18 carrying the skid or fill and test package 40 is recovered to the support vessel 10.

Figure 16:
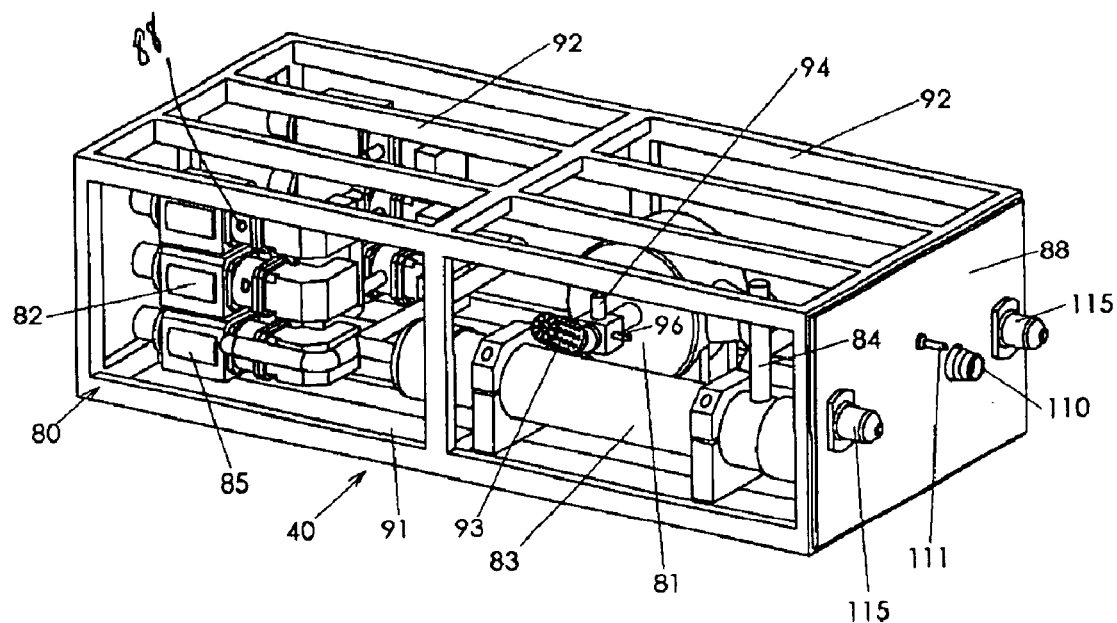
FIG. 16 is an isometric view of a pumping skid of the present invention.
Figures 17, 18:
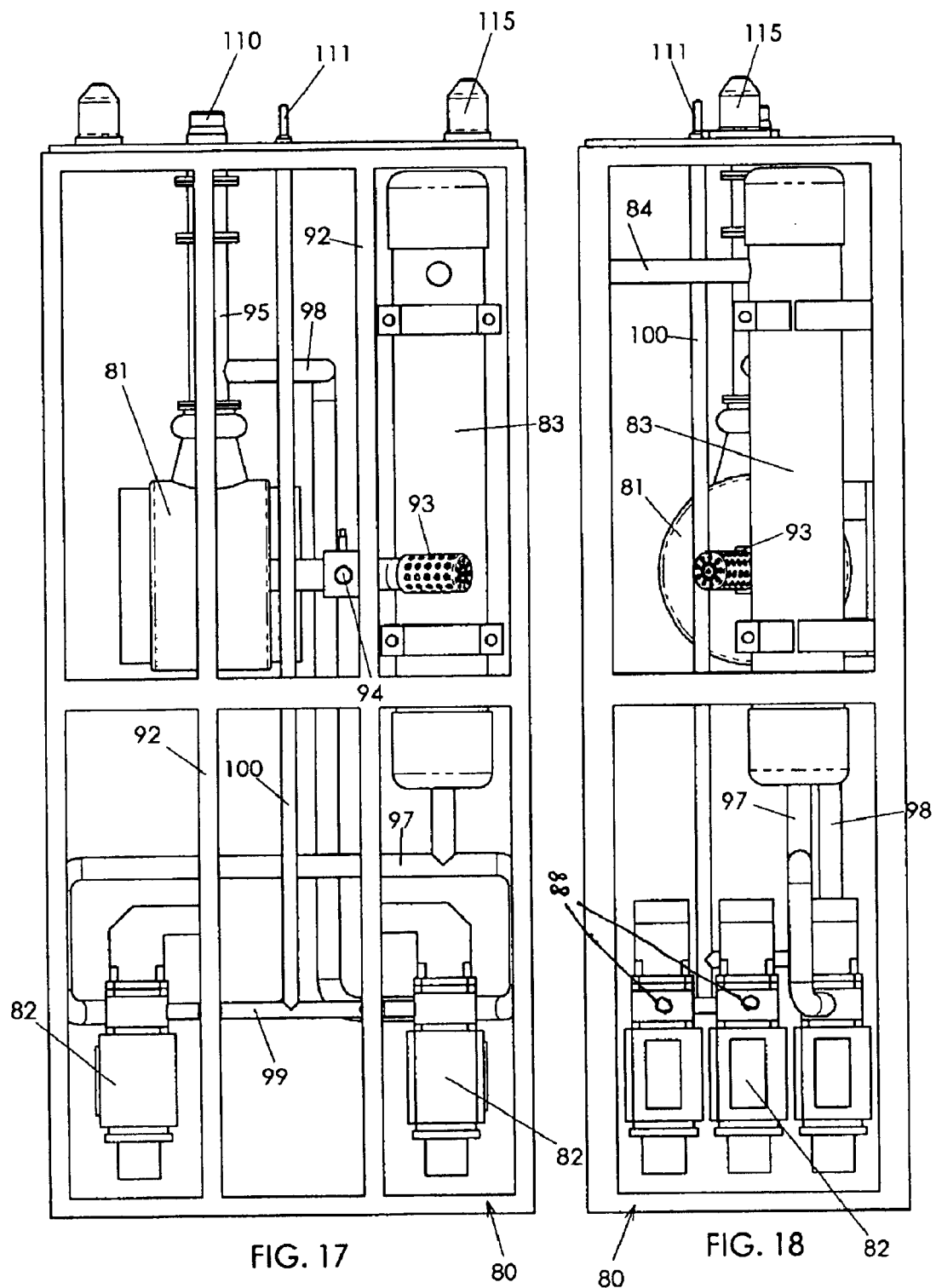
FIG. 17 is a top view of the pumping skid.
FIG. 18 is a right side view of the pumping skid.

Referring now to FIG. 16, a pumping skid 40 that has all the equipment on one skid is illustrated and described in detail. This pumping skid 40 comprises a skid structure 80, a high volume pump 81, a battery of high pressure pumps 82, a chemical water treating tank 83 with a fill line 84, low pressure chemical pump 85 and a high pressure chemical pump 86. In addition, pumping skid 40 includes a docking plate 88 and a bouyancy compensator 90. The skid structure 80 comprises a floor 91 (see FIG. 17) on which the pumps 81 and 82 and the chemical water treating tank 83 are mounted and an open frame of multiple bars 92 which surround the equipment. The floor 91 and multiple bars 92 are welded together to make a single structure or liftable unit that is attachable to the SV 18.

Instead of a skid having all equipment, it may be preferred to have specially designed skids to carry out the filling operation only or the hydrostatic testing or the dewatering/drying operation. A preferred filling skid 40 has a single high volume-low pressure pump 81. The pump 81 may be an electric driven centrifugal pump 81. The pump 81 has two inlets 93 and 94, preferably one 93 with a filter and the inlet 94 with a fixed diameter such that the inlet flow is that of the outflow of the pump, and an outlet line 95. A valve 96 permits choice of the two inlets 93 or 94, inlet 94 being chosen when the head between the inlet 34 and the surface is so great that the flow rate is greater than the designed flow rate of the pump, preventing the burning out of the pump motor.

A skid 40 with a pump 81 or 82 may also be used in the dewatering operation. By reversing the pump connections so that the pipeline 16 is connected to the inlet 94 of the pump 81 or the inlet(s) 88 of pump(s) 82, the pump may be operated as a suction pump to pump water from the pipeline 16.

A filling skid 40 that is capable of treating the seawater with chemicals preferably preferably has, in addition to the skid structure 80 and the high volume centrifugal pump 81, a chemical tank 81 that is filled with chemicals to neutralize the seawater in the pipeline 16 and a chemical pump 85 that is connected to the chemical tank 81 by line 97. The outlet of pump 85 is connected to the outlet line 95 of pump 81 by line 98.

A filling and testing skid 40 of the present invention has in addition to the equipment on a filling skid, a battery of high-pressure pumps 82, preferably reciprocating pumps. When a plurality of high-pressure pumps 82 are used, a manifold 99 connects the pumps to a single outlet line 100.

A filling and testing skid 40 that is capable of treating the seawater with chemicals preferably has, in addition to the structure of the filling and testing skid above, a chemical pump 86 that is connected to the chemical tank by line 97. The outlet of pump 85 is connected to the high-pressure outlet line 100 by line 101.

Figure 22:
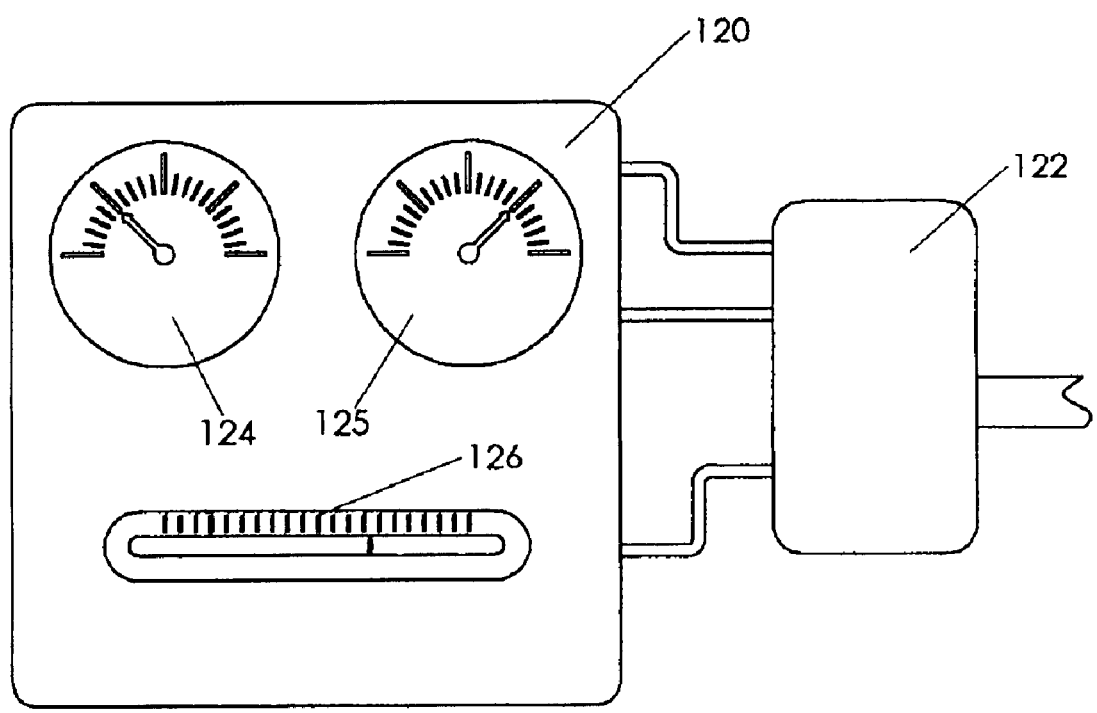
FIG. 22 is a panel of instruments on the support structure.

Referring now to FIG. 22, a panel 120 is shown that is mounted on support vessel 10. A data recorder 122 receives that data from panels 24 and 34 and shown on the gauges 124, 125, 126 etc. that show pressure, flow rates, temperature or other recorded data.

The skids illustrated show outlet line 95 of the high volume pump 81 extending to a high flow robotic stab 110 at a docking plate 88 and the outlet line 100 from the battery of high pressure pumps extending to a high pressure robotic stab 111 at docking plate 88. The docking plate 88 has a plurality of docking latches 115. With a docking plate 88, the skid 40 is placed against a complementary structure that connects the lines directly with the pipeline. It is understood that instead of a docking plate 88 on the skids, flexible lines or conduits may be utilized to make the necessary connections. The ends of the flexible lines may be placed in holsters on the skid for easy access by the robotic arm 19 of the SV 18.

Figure 19:
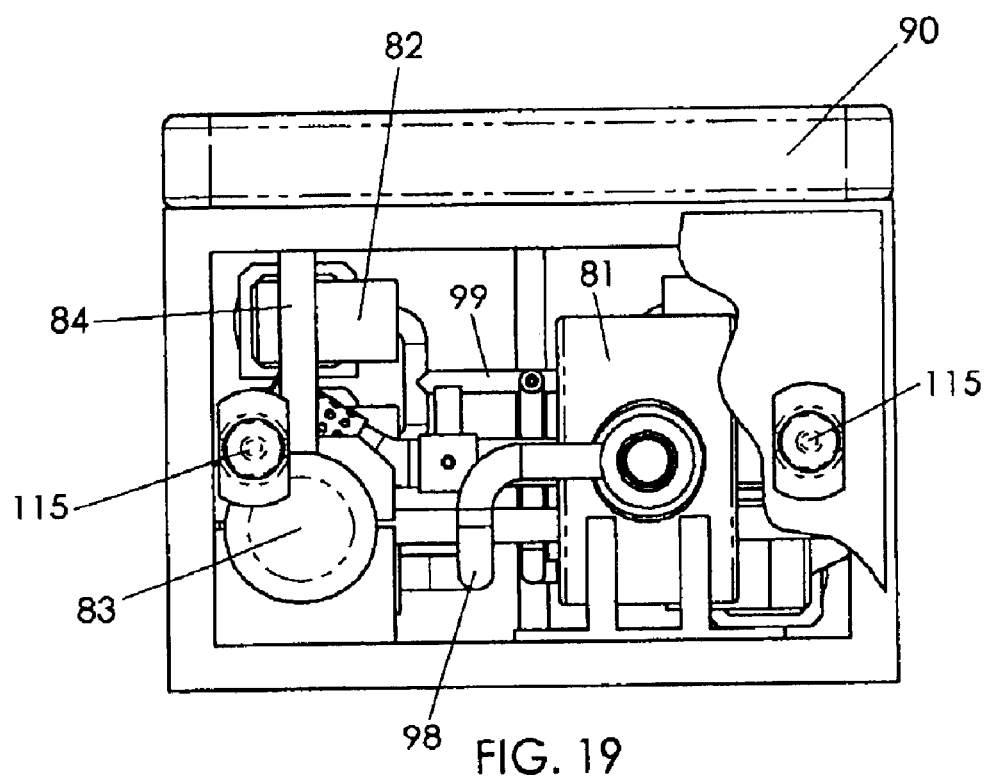
FIG. 19 is a front view of the pumping skid.
Figure 20:
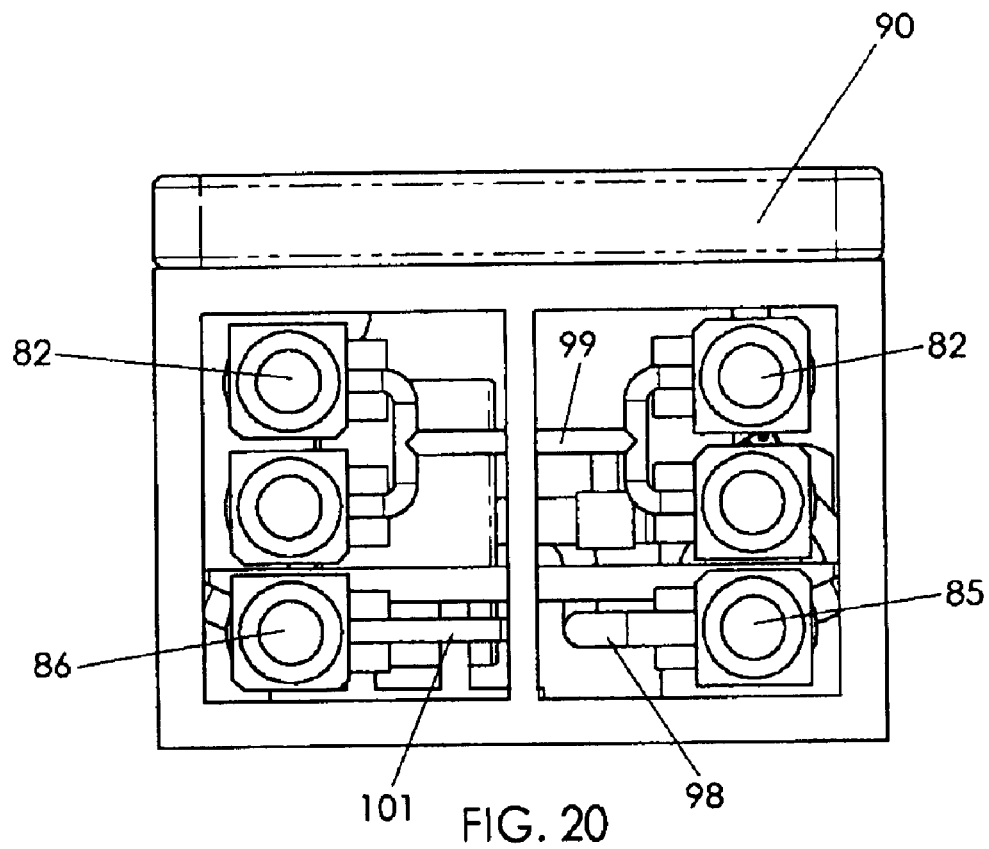
FIG. 20 is a back view of the pumping skid.
Figure 21:
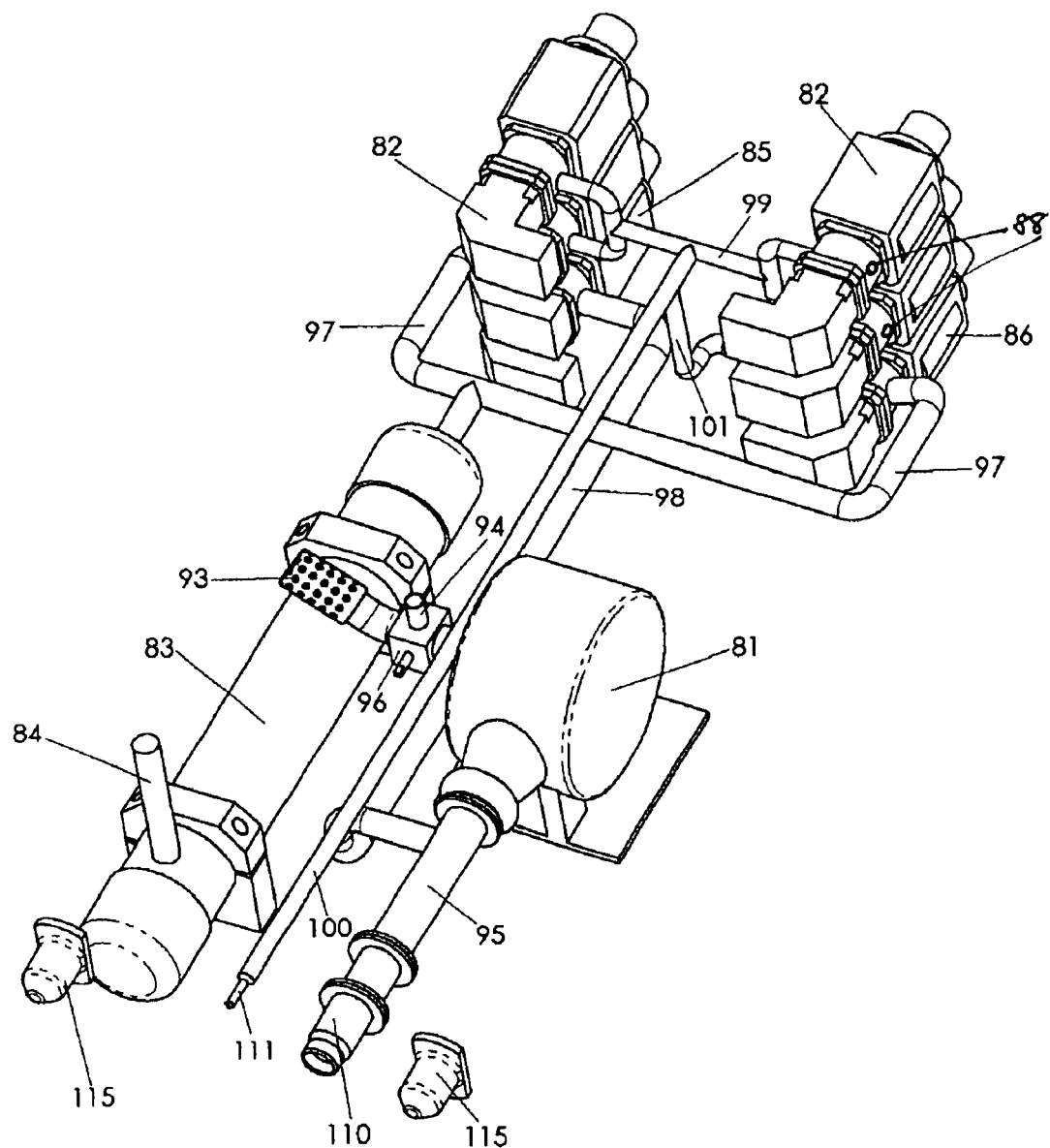
FIG. 21 is an isometric view of the representative equipment on the pumping skid without the skid structure or the buoyancy compensator.

The placement of the pumps 81 and 82 and chemical tank 83 is subject to considerable variation since the desired result of placement is to obtain a center of gravity near the center of the skid 40. Weights may be added to obtain the desired center of gravity, In addition, a buoyancy compensator 90 (see FIGS. 16, 19 and 20) is preferably placed on the top of the skid structure 80 that has sufficient buoyancy that when attached the entire skid 40 will float. An opening in the top of buoyancy compensator 90 allows the refilling of the chemical tank 83 through line 84.

The commissioning operation has been described in detail, but it is understood that this detail is representative, and that variations in the method may be appropriate for specific applications. Significant improvements to the prior art have been set forth. Modifications and additions may be added without changing the commissioning operation as set forth. There are many changes in details that may be made such that more than a single tank for water treating may be added, filters may be added to the high pressure pumps, more than one pig may be used, methanol or other chemicals may be added between pigs, the pig may include tracking means to name some; however, changes in detail do not change the method as set forth and described.

What is claimed is:

1. A testing pump skid that is moved by and powered by an SV to a subsea end of a pipeline for hydrostatically testing the pipeline that comprises:
   a skid structure, and
   a high pressure pump for hydrostatically elevating the pressure in said pipeline by pumping subsea water into said subsea end of said pipeline to check for leaks, said pump powered by said SV.

2. A skid according to claim 1 that further includes:
   a chemical tank, and
   means for connecting said chemical tank to said outlet of said pump.

3. A skid according to claim 1 that further includes:
   a buoyancy compensator on said skid structure.

4. A filling, pigging and testing pump skid that is moved by and powered by an SV that comprises:
   a skid structure,
   a high volume pump on said skid for moving at least one pig from one end to the other end of a pipeline, and
   a high-pressure pump on said skid for moving all pigs to the other end of said pipeline and for hydrostatically elevating the pressure in said pipeline to check for leaks, said pumps powered by said SV.

5. A skid according to claim 4 that further includes:
   a chemical tank, and
   means for connecting said chemical tank to said outlet of said pumps.

6. A pipeline commissioning skid that is moved by and powered by an SV that comprises:
   a skid structure, a high volume pump for pigging said pipeline with sea water, a high-pressure pump that pumps seawater into the subsea end of said pipeline for hydrostatically testing said pipeline, a chemical water treating tank that provides chemical to treat the introduced seawater, means for connecting the outlets of said pumps to a subsea end of a pipeline outside said skid and a buoyancy compensator, said pumps on said skid structure being powered by said SV.

7. A dewatering skid that is moved by and powered by an SV to the subsea end of a pipeline filled with water and has a positive displacement force pushing the water toward said skid that comprises:
   a skid structure,
   a dewatering pump on said skid powered by said SV, and
   means connecting said pump to a pipeline for removing water from said pipeline.

8. A dewatering skid according to claim 7 wherein said positive displacement force is gas.

* * * * *

(12) INTER PARTES REEXAMINATION CERTIFICATE (0216th)
United States Patent
Tucker et al.

(10) Number: US 6,840,088 C1
(45) Certificate Issued: *Dec. 7, 2010

(54) SUBSEA VEHICLE ASSISTED PUMPING SKID PACKAGES

(75) Inventors: David M. Tucker, Katy, TX (US); Charles R. Yemington, Arlington, TX (US)

(73) Assignee: Valkyrie Commissioning Services, Inc., Houston, TX (US)

Reexamination Request:
No. 95/000,128, Feb. 1, 2006

Reexamination Certificate for:
Patent No.: 6,840,088
Issued: Jan. 11, 2005
Appl. No.: 10/179,623
Filed: Jun. 25, 2002

(*) Notice: This patent is subject to a terminal disclaimer.

Related U.S. Application Data

(63) Continuation-in-part of application No. 09/892,314, filed on Jun. 26, 2001, now Pat. No. 6,539,778.
(60) Provisional application No. 60/301,166, filed on Jun. 26, 2001, provisional application No. 60/301,259, filed on Jun. 26, 2001, provisional application No. 60/301,167, filed on Jun. 26, 2001, provisional application No. 60/301,466, filed on Jun. 26, 2001, and provisional application No. 60/301,465, filed on Jun. 26, 2001.

(51) Int. Cl.
*G01M 3/04* (2006.01)
*F16L 1/26* (2006.01)

(52) U.S. Cl. .................. 73/49.5; 73/865.9; 73/865.8
(58) Field of Classification Search ................ None
See application file for complete search history.

(56) References Cited

U.S. PATENT DOCUMENTS

| | | |
|---|---|---|
| 3,520,358 A | 7/1970 | Brooks |
| 3,708,990 A | 1/1973 | Crooke |
| 3,777,499 A | 12/1973 | Matthews, Jr. |
| 4,229,121 A | 10/1980 | Brown |
| 4,234,268 A | 11/1980 | Scodino |
| 4,332,277 A | 6/1982 | Adkins et al. |
| 4,344,319 A | 8/1982 | Hancock |
| 4,463,597 A | 8/1984 | Pierce et al. |
| 4,906,136 A | 3/1990 | Norbom et al. |
| 5,044,827 A | 9/1991 | Gray et al. |
| 5,267,616 A | 12/1993 | Silva et al. |
| 5,273,376 A | 12/1993 | Ritter |
| 5,348,451 A | 9/1994 | Mohn |
| 5,842,816 A | 12/1998 | Cunningham |

(Continued)

FOREIGN PATENT DOCUMENTS

| | | |
|---|---|---|
| GB | 2195739 | 4/1988 |
| JP | 6-226185 | 8/1994 |
| WO | WO 02/084160 A1 | 10/2002 |
| WO | WO02/008658 | 11/2002 |

OTHER PUBLICATIONS

Graves, Syd; "Vessel-free flooding of deepwater pipelines using the Copipe SPU", The Deepwater Pipeline Technology Conference, New Orleans, LA Mar. 9–11, 1998; 15 pages.

(Continued)

*Primary Examiner*—Catherine S. Williams

(57) ABSTRACT

The present invention is directed to a pumping skid that may comprise a skid structure, a high volume pump, a battery of high-pressure pumps, a chemical water treating tank, a docking plate and a bouyancy compensator. More specifically, the skid is carried by a subsea vehicle (hereinafter "SV") that provides the power to the pumps located on the skid to inject water/chemical, pressurize the water, dewater, and dry, the pipeline. The present invention may be part of the commissioning of a new or old pipeline or a new portion of a pipeline in which a purging of the line with a compressed gas and drying of the line is required. After commissioning, product flows through the pipeline.

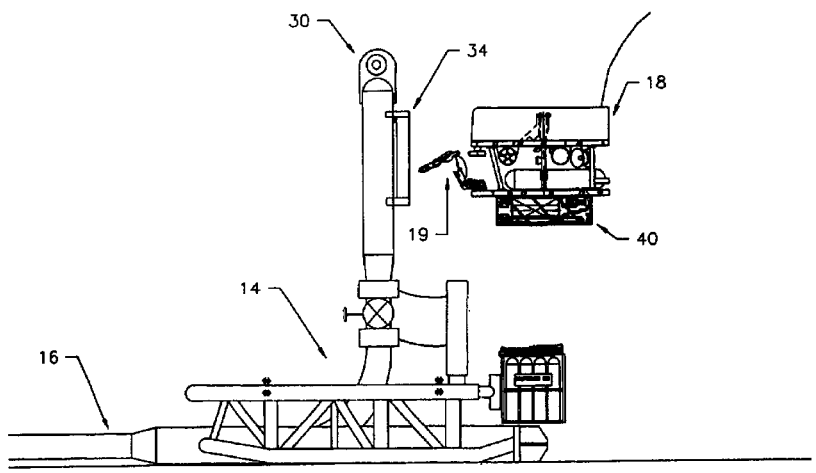

U.S. PATENT DOCUMENTS

| | | | |
|---|---|---|---|
| 6,022,421 | A | 2/2000 | Bath et al. |
| 6,109,829 | A | 8/2000 | Cruickshank |
| 6,170,493 | B1 | 1/2001 | Sivacoe |
| 6,200,068 | B1 | 3/2001 | Bath et al. |
| 6,234,717 | B1 | 5/2001 | Corbetta |
| 6,336,238 | B1 | 1/2002 | Tarlton |
| 6,454,492 | B1 | 9/2002 | Dean et al. |
| 2002/0040782 | A1 | 4/2002 | Rytlewski et al. |
| 2002/0059687 | A1 | 5/2002 | Smith et al. |
| 2003/0170077 | A1 | 9/2003 | Herd |

OTHER PUBLICATIONS

Graves, Les, "Deepwater Pipeline Flooding and Pigging Without Connection to a Surface Vessel," Transactions–Institute of Marine Engineers, Series C, 1999; vol. 111, No. 1, pp. 151–160.

NACE International, "Public Affairs– White Papers." http://www.nace.org.nace/content/publicaffairs/media/pims.asp.

Battelle, "Energy & Environment: Determining Benefits of Hydrotesting," http://www.battelle.org/environment/hydrotesting.stm.

"Hydrostatic Test," http://en.wikipedia.org/wiki/hydrostatic_test.

Furlow, William, "ROV–Base Solution Simplifies Pipeline Commissioning: Moving Pumps Subsea Reduces Costs, Simplifies Process," Offshore Magazine, Mar. 2002.

Engineered Products Group, "Pump Division Product Catalogue," May 2002, pp. 1–24.

49 CFR Part 195—Transportation of Hazardous Liquids by Pipeline.

Pressure Testing of Liquid Petroleum Pipelines. API Recommended Practice 1110. Fourth Edition Mar. 1997.

Office action dated Sep. 23, 2008 in co–pending reissue U.S. Appl. No. 10/716,248.

Response to Office Action dated Feb. 23, 2009 in co–pending reissue U.S. Appl. No. 10/716,248.

Subsea Pig Works Independent of DSVs, available on the Internet at http://www.offshore–mag.com, Feb. 1998, pp. 1–2.

BJ Process and Pipeline Services Completes Major Pipeline Pre–commissioning Operation for DSND, BJ Process and Pipeline Services, Aug. 29, 2000, available on the internet at http://www.hydrocarbononline.com, pp. 1–2.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4-6 is confirmed.

Claims 1 and 7 are determined to be patentable as amended.

Claims 2-3 and 8, dependent on an amended claim, are determined to be patentable.

New claims 9 and 10 are added and determined to be patentable.

1. A testing pump skid that is moved by and powered by an SV to a subsea end of a pipeline for hydrostatically testing the pipeline that comprises:

a skid structure, and a high pressure pump [for] *mounted on the skid structure, wherein said high pressure pump is adapted to* hydrostatically [elevating] *elevate* the pressure in said pipeline *to a level sufficient to perform a hydrostatic commissioning test* by pumping subsea water into said subsea end of said pipeline to check for leaks, *and wherein* said pump *is* powered by said SV.

7. A dewatering skid that is moved by and powered by an SV to the subsea end of a pipeline filled with water and has a positive displacement force pushing the water toward said skid that comprises:

a skid structure, a dewatering pump on said skid powered by said SV, and means connecting *an inlet of* said pump to [a] *the* pipeline for removing water from said pipeline.

*9. A dewatering skid according to claim 7, wherein said dewatering pump is a reciprocating pump.*

*10. A testing pump skid according to claim 1, further comprising a high volume pump, wherein the high volume pump is adapted to fill the pipeline by pumping seawater to push a pig through the pipeline.*

\* \* \* \* \*